US011838910B2

(12) United States Patent
Fong et al.

(10) Patent No.: US 11,838,910 B2
(45) Date of Patent: Dec. 5, 2023

(54) TECHNIQUES FOR DYNAMIC SCHEDULING OF REVERSE SIDELINK TRAFFIC

(71) Applicant: QUALCOMM Incorporated, San Diego, CA (US)

(72) Inventors: Lik Hang Silas Fong, Bridgewater, NJ (US); Jing Sun, San Diego, CA (US); Piyush Gupta, Bridgewater, NJ (US); Xiaojie Wang, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/353,405

(22) Filed: Jun. 21, 2021

(65) Prior Publication Data

US 2021/0400655 A1 Dec. 23, 2021

Related U.S. Application Data

(60) Provisional application No. 63/042,308, filed on Jun. 22, 2020.

(51) Int. Cl.
*H04W 72/04* (2023.01)
*H04W 72/12* (2023.01)
(Continued)

(52) U.S. Cl.
CPC .......... *H04W 72/20* (2023.01); *H04L 1/1812* (2013.01)

(58) Field of Classification Search
CPC ... H04W 28/04; H04W 72/04; H04W 72/042; H04W 88/08; H04W 72/0406; H04W 72/1278; H04L 5/0007; H04L 1/1812
(Continued)

(56) References Cited

U.S. PATENT DOCUMENTS

2016/0338094 A1  11/2016 Faurie et al.
2017/0280471 A1*  9/2017 Lee ................. H04W 72/0406
(Continued)

FOREIGN PATENT DOCUMENTS

CN  WO 2019/028847 A1 *  2/2019  ............ H04W 12/08
EP            3267748 A1      1/2018
(Continued)

OTHER PUBLICATIONS

3GPP TSG RAN WG1 Ad-Hoc Meeting 1901, Taipei, Taiwan, Jan. 21-25, 2019, R1-1900445, Agenda item: 7.2.4.1.4, Source: AT&T, Title: Resource allocation mechanism. (Year: 2019).*
(Continued)

*Primary Examiner* — Peter G Solinsky
*Assistant Examiner* — Sanjay K Dewan
(74) *Attorney, Agent, or Firm* — Holland & Hart LLP/ QUALCOMM Incorporated

(57) ABSTRACT

Methods, systems, and devices for wireless communications are described. A first user equipment (UE) may determine a first set of resources for communications over a sidelink communication link between the first UE and a second UE. The first UE may transmit, to the second UE via the sidelink communication link, a first sidelink control information including a reverse sidelink scheduling indicator based on determining the first set of resources. The first UE may additionally transmit, to the second UE via the sidelink communication link, a second sidelink control information indicating a second set of resources for reverse sidelink transmissions from the second UE to the first UE over the sidelink communication link, where transmitting the second sidelink control information is based on transmitting the first sidelink control information. The first UE may receive, from the second UE, a reverse sidelink message in response to transmitting the second sidelink control information.

78 Claims, 13 Drawing Sheets

(51) Int. Cl.
*H04L 1/18* (2023.01)
*H04W 72/20* (2023.01)
*H04L 1/1812* (2023.01)

(58) Field of Classification Search
USPC .......................................................... 370/329
See application file for complete search history.

(56) References Cited

U.S. PATENT DOCUMENTS

| | | | |
|---|---|---|---|
| 2018/0103460 A1 | 4/2018 | Sharma et al. | |
| 2019/0037622 A1 | 1/2019 | Blasco et al. | |
| 2019/0053251 A1 | 2/2019 | Loehr et al. | |
| 2019/0116609 A1 | 4/2019 | Feng et al. | |
| 2019/0116626 A1 | 4/2019 | Zhao | |
| 2019/0373647 A1 | 12/2019 | Rugeland et al. | |
| 2020/0099476 A1 | 3/2020 | Park | |
| 2021/0136783 A1 | 5/2021 | Fakoorian et al. | |
| 2021/0227508 A1 | 7/2021 | Lee et al. | |
| 2022/0140951 A1* | 5/2022 | He ........................ | H04L 5/0055 370/329 |
| 2022/0140956 A1* | 5/2022 | Park ...................... | H04L 1/1812 370/329 |
| 2022/0141897 A1* | 5/2022 | Lee ........................ | H04W 76/14 370/329 |

FOREIGN PATENT DOCUMENTS

| | | |
|---|---|---|
| EP | 3372028 A1 | 9/2018 |
| EP | 3557930 A1 | 10/2019 |
| EP | 3737176 A1 | 11/2020 |
| WO | WO-2016163972 A1 | 10/2016 |
| WO | WO-2019028847 A1 | 2/2019 |
| WO | WO-2019164353 A1 | 8/2019 |
| WO | WO-2020088141 A1 | 5/2020 |
| WO | WO-2020123162 A1 | 6/2020 |

OTHER PUBLICATIONS

3GPP TSG RAN WG1 #99, Reno, USA, Nov. 18-22, 2019, R1-1912322, Agenda Item: 7.2.4.1, Source: Lenovo, Motorola Mobility, Title: Sidelink Physical layer structure in NR V2X. (Year: 2019).*
AT&T: "Resource Allocation Mechanism", 3GPP Draft, 3GPP TSG RAN WG1 Ad-Hoc Meeting 1901, R1-1900445, Resource Allocation Mechanism-V2, 3rd Generation Partnership Project (3GPP), Mobile Competence Centre, 650, Route Des Lucioles, F-06921 Sophia-Antipolis Cedex, France, vol. Ran WG1, No. Taipei, Taiwan, 20190121 - 20190125, Jan. 20, 2019 (Jan. 20, 2019), XP051593358, 14 Pages, Retrieved from the Internet: URL: http://www.3gpp.org/ftp/Meetings%5F3GPP%5FSYNC/RAN1/Docs/R1%2D1900445%2Ezip. [Retrieved on Jan. 20, 2019] Sections "4.6 Signaling assign/schedule resources for other UE" "4.9 Network assistance to support Mode 2D".
International Search Report and Written Opinion—PCT/US2021/038462—ISA/EPO—dated Oct. 26, 2021.
Lenovo, et al., "Sidelink Physical Layer Structures in Nr V2X", 3GPP Draft, 3GPP TSG RAN WG1 #99, R1-1912322, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019 (Nov. 8, 2019), XP051819996, 10 Pages, Retrieved from the Internet: URL: https://ftp.3gpp.org/tsg_ran/WG1_RL1/TSGR1_99/Docs/R1-1912322.zip. R1-1912322.docx. [Retrieved on Nov. 8, 2019 ] Section 11 2.2 Two Stage SCI Design.
Lien S-Y., et al., "3GPP NR Sidelink Transmissions Toward 5G V2X", IEEE Access, Special Section on Communication and Fog/Edge Computing Towards Intelligent Connected Vehicles (ICVS), Received Dec. 17, 2019, Accepted Jan. 22, 2020, date of publication Feb. 13, 2020, date of current version Feb. 28, 2020, vol. 8, XP011774398, DOI: 10.1109/ACCESS.2020.2973706, pp. 35368-35382.
Park K-Y., et al., "Autonomous Mode Selection Scheme for Underlay Device-to-Device Communication", 2017 International Symposium on Networks, Computers and Communications (ISNCC), IEEE, May 16, 2017 (May 16, 2017), XP033226760, pp. 1-5, DOI: 10.1109/ISNCC.2017.8071976 [retrieved on Oct. 18, 2017] Section IIB, figure 3.

* cited by examiner

TECHNIQUES FOR DYNAMIC SCHEDULING OF REVERSE SIDELINK TRAFFIC

CROSS REFERENCE

The present application for patent claims the benefit of U.S. Provisional Patent Application No. 63/042,308 by FONG et al., entitled "TECHNIQUES FOR DYNAMIC SCHEDULING OF REVERSE SIDELINK TRAFFIC," filed Jun. 22, 2020, assigned to the assignee hereof, and expressly incorporated by reference herein.

INTRODUCTION

The following relates generally to wireless communications and more specifically to scheduling sidelink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a first user equipment (UE) is described. The method may include transmitting to a second UE via a sidelink communication link, a first sidelink control information (SCI) indicating a first set of resources. The method may further include transmitting, to the second UE via the sidelink communication link, a second sidelink control information including a reverse sidelink scheduling indicator based on the first set of resources, where transmitting the second sidelink control information is based on transmitting the first sidelink control information, the second sidelink control information being different from the first sidelink control information. The method may further include receiving, from the second UE, a reverse sidelink message in response to transmitting the second sidelink control information.

An apparatus for wireless communication at a first UE is described. The apparatus may include a processor, and memory coupled with the processor, the processor and memory configured to transmit to a second UE via a sidelink communication link, a first sidelink control information indicating a first set of resources. The processor and memory may be further configured to transmit, to the second UE via the sidelink communication link, a second sidelink control information including a reverse sidelink scheduling indicator based on the first set of resources, where transmitting the second sidelink control information is based on transmitting the first sidelink control information, the second sidelink control information being different from the first sidelink control information. The processor and memory may be further configured to receive, from the second UE, a reverse sidelink message in response to transmitting the second sidelink control information.

Another apparatus for wireless communication at a first UE is described. The apparatus may include means for transmitting to a second UE via a sidelink communication link, a first sidelink control information indicating a first set of resources, and means for transmitting, to the second UE via the sidelink communication link, a second sidelink control information including a reverse sidelink scheduling indicator based on the first set of resources, where transmitting the second sidelink control information is based on transmitting the first sidelink control information, the second sidelink control information being different from the first sidelink control information. The apparatus may further include means for receiving, from the second UE, a reverse sidelink message in response to transmitting the second sidelink control information.

A non-transitory computer-readable medium storing code for wireless communication at a first UE is described. The code may include instructions executable by a processor to transmit to a second UE via a sidelink communication link, a first sidelink control information indicating a first set of resources. The processor and memory may be further configured to transmit, to the second UE via the sidelink communication link, a second sidelink control information including a reverse sidelink scheduling indicator based on the first set of resources, where transmitting the second sidelink control information is based on transmitting the first sidelink control information, the second sidelink control information being different from the first sidelink control information. The processor and memory may be further configured to receive, from the second UE, a reverse sidelink message in response to transmitting the second sidelink control information.

Some examples of the method, apparatuses, and non-transitory computer-readable medium described herein may further include operations, features, means, or instructions for transmitting, via the second sidelink control information, an indication of a request for the second UE to transmit a new reverse sidelink message, retransmit a previous reverse sidelink message, or both, where receiving the reverse sidelink message may be in response to transmitting the indication of the request.

Some examples of the method, apparatuses, and non-transitory computer-readable medium described herein may further include operations, features, means, or instructions for transmitting, via the second sidelink control information, a hybrid automatic repeat request (HARQ) process identifier associated with the reverse sidelink transmissions from the second UE to the first UE.

Some examples of the method, apparatuses, and non-transitory computer-readable medium described herein may further include operations, features, means, or instructions for transmitting, to the second UE, a feedback message in response to receiving the reverse sidelink message and the HARQ process identifier.

Some examples of the method, apparatuses, and non-transitory computer-readable medium described herein may further include operations, features, means, or instructions for transmitting, via the sidelink communication link, a sidelink grant indicating a second set of resources for reverse sidelink transmissions from the second UE to the first UE, where receiving the reverse sidelink message may be based on transmitting the sidelink grant.

Some examples of the method, apparatuses, and non-transitory computer-readable medium described herein may further include operations, features, means, or instructions for transmitting, via at least one of the first sidelink control information or the second sidelink control information, an indication of a modulation and coding scheme (MCS) associated with the reverse sidelink message, where receiving the reverse sidelink message may be based on transmitting the indication of the MCS.

Some examples of the method, apparatuses, and non-transitory computer-readable medium described herein may further include operations, features, means, or instructions for transmitting, via the second sidelink control information, an indication of a redundancy version associated with the reverse sidelink message, where receiving the reverse sidelink message may be based on transmitting the indication of the redundancy version.

Some examples of the method, apparatuses, and non-transitory computer-readable medium described herein may further include operations, features, means, or instructions for receiving, from the second UE, a third sidelink control information, a fourth sidelink control information, or both, where receiving the reverse sidelink message may be based on receiving the third sidelink control information, the fourth sidelink control information, or both.

In some examples of the method, apparatuses, and non-transitory computer-readable medium described herein, the second sidelink control information indicates a second set of resources for reverse sidelink transmissions from the second UE to the first UE over the sidelink communication link, and the reverse sidelink message may be received within the second set of resources.

Some examples of the method, apparatuses, and non-transitory computer-readable medium described herein may further include operations, features, means, or instructions for monitor the second set of resources associated with the reverse sidelink transmissions from the second UE to the first UE based on transmitting the second sidelink control information, where receiving the reverse sidelink message may be based on monitoring the second set of resources.

In some examples of the method, apparatuses, and non-transitory computer-readable medium described herein, the second set of resources include a set of time resources and a set of frequency resources allocated for the reverse sidelink transmissions from the second UE to the first UE over the sidelink communication link.

Some examples of the method, apparatuses, and non-transitory computer-readable medium described herein may further include operations, features, means, or instructions for transmitting, via the second sidelink control information, an indication of a first identifier associated with the first UE and a second identifier associated with the second UE, where receiving the reverse sidelink message may be based on the indication of the first identifier and the indication of the second identifier.

Some examples of the method, apparatuses, and non-transitory computer-readable medium described herein may further include operations, features, means, or instructions for transmitting the first sidelink control information via a physical sidelink control channel (PSCCH) and transmitting the second sidelink control information via a physical sidelink shared channel (PSSCH).

In some examples of the method, apparatuses, and non-transitory computer-readable medium described herein, the first sidelink control information includes a first-stage sidelink control information, and the second sidelink control information includes a second-stage sidelink control information.

In some examples of the method, apparatuses, and non-transitory computer-readable medium described herein, the reverse sidelink scheduling indicator may be indicated in a bit field of the second sidelink control information.

A method for wireless communication at a first UE is described. The method may include receiving, from a second UE via a sidelink communication link between the first UE and the second UE, a first sidelink control information including indicating a first set of resources. The method may further include receiving, from the second UE via the sidelink communication link, a second sidelink control information including a reverse sidelink scheduling indicator based on the first set of resources, where receiving the second sidelink control information is based on receiving the first sidelink control information, the second sidelink control information being different from the first sidelink control information. The method may further include transmitting, to the second UE, a reverse sidelink message in response to receiving the second sidelink control information.

An apparatus for wireless communication at a first UE is described. The apparatus may include a processor, and memory coupled to the processor, the processor and memory configured to receive, from a second UE via a sidelink communication link between the first UE and the second UE, a first sidelink control information including indicating a first set of resources. The processor and memory may be further configured to cause the apparatus to receive, from the second UE via the sidelink communication link, a second sidelink control information including a reverse sidelink scheduling indicator based on the first set of resources, where receiving the second sidelink control information is based on receiving the first sidelink control information, the second sidelink control information being different from the first sidelink control information. The processor and memory may be further configured to cause the apparatus to transmit, to the second UE, a reverse sidelink message in response to receiving the second sidelink control information.

Another apparatus for wireless communication at a first UE is described. The apparatus may include means for receiving, from a second UE via a sidelink communication link between the first UE and the second UE, a first sidelink control information including indicating a first set of resources. The apparatus may further include means for receiving, from the second UE via the sidelink communication link, a second sidelink control information including a reverse sidelink scheduling indicator based on the first set of resources, where receiving the second sidelink control information is based on receiving the first sidelink control information, the second sidelink control information being different from the first sidelink control information. The apparatus may further include means for transmitting, to the second UE, a reverse sidelink message in response to receiving the second sidelink control information.

A non-transitory computer-readable medium storing code for wireless communication at a first UE is described. The code may include instructions executable by a processor to receive, from a second UE via a sidelink communication link between the first UE and the second UE, a first sidelink control information including indicating a first set of resources. The processor and memory may be further configured to receive, from the second UE via the sidelink communication link, a second sidelink control information including a reverse sidelink scheduling indicator based on the first set of resources, where receiving the second sidelink control information is based on receiving the first sidelink control information, the second sidelink control information being different from the first sidelink control information. The processor and memory may be further configured to transmit, to the second UE, a reverse sidelink message in response to receiving the second sidelink control information.

Some examples of the method, apparatuses, and non-transitory computer-readable medium described herein may further include operations, features, means, or instructions for receiving, via the second sidelink control information, an indication of a request for the second UE to transmit a new reverse sidelink message, retransmit a previous reverse sidelink message, or both, where transmitting the reverse sidelink message may be in response to receiving the indication of the request.

Some examples of the method, apparatuses, and non-transitory computer-readable medium described herein may further include operations, features, means, or instructions for receiving, via the second sidelink control information, a HARQ process identifier associated with the reverse sidelink transmissions from the first UE to the second UE.

Some examples of the method, apparatuses, and non-transitory computer-readable medium described herein may further include operations, features, means, or instructions for receiving, from the second UE, a feedback message in response to transmitting the reverse sidelink message and the HARQ process identifier.

Some examples of the method, apparatuses, and non-transitory computer-readable medium described herein may further include operations, features, means, or instructions for receiving, from the second UE via the sidelink communication link, a sidelink grant indicating a set of resources for reverse sidelink transmissions from the first UE to the second UE, where transmitting the reverse sidelink message may be based on receiving the sidelink grant.

Some examples of the method, apparatuses, and non-transitory computer-readable medium described herein may further include operations, features, means, or instructions for receiving, via at least one of the first sidelink control information or the second sidelink control information, an indication of an MCS associated with the reverse sidelink message, where transmitting the reverse sidelink message may be based on receiving the indication of the MCS.

Some examples of the method, apparatuses, and non-transitory computer-readable medium described herein may further include operations, features, means, or instructions for receiving, via the second sidelink control information, an indication of a redundancy version associated with the reverse sidelink message, where transmitting the reverse sidelink message may be based on receiving the indication of the redundancy version.

Some examples of the method, apparatuses, and non-transitory computer-readable medium described herein may further include operations, features, means, or instructions for transmitting, to the second UE, a third sidelink control information, a fourth sidelink control information, or both, where transmitting the reverse sidelink message may be based on transmitting the third sidelink control information, the fourth sidelink control information, or both.

In some examples of the method, apparatuses, and non-transitory computer-readable medium described herein, the second sidelink control information indicates a set of resources for reverse sidelink transmissions from the second UE to the first UE over the sidelink communication link, and the reverse sidelink message may be transmitted within the set of resources.

In some examples of the method, apparatuses, and non-transitory computer-readable medium described herein, the set of resources include a set of time resources and a set of frequency resources allocated for the reverse sidelink transmissions from the first UE to the second UE over the sidelink communication link.

Some examples of the method, apparatuses, and non-transitory computer-readable medium described herein may further include operations, features, means, or instructions for receiving, via the second sidelink control information, an indication of a first identifier associated with the first UE and a second identifier associated with the second UE, where transmitting the reverse sidelink message may be based on the indication of the first identifier and the indication of the second identifier.

Some examples of the method, apparatuses, and non-transitory computer-readable medium described herein may further include operations, features, means, or instructions for receiving the first sidelink control information via a PSCCH and receiving the second sidelink control information via a PSSCH.

In some examples of the method, apparatuses, and non-transitory computer-readable medium described herein, the first sidelink control information includes a first-stage sidelink control information, and, the second sidelink control information includes a second-stage sidelink control information, and, and the reverse sidelink scheduling indicator may be indicated in a bit field of the second sidelink control information.

A method is described. The method may include transmitting, to a second UE via a sidelink communication link, a first sidelink control information including a reverse sidelink scheduling indicator, and transmitting, to the second UE via the sidelink communication link, a second sidelink control information indicating a set of resources for reverse sidelink transmissions from the second UE to the first UE over the sidelink communication link, where transmitting the second sidelink control information is based on transmitting the first sidelink control information, the second sidelink control information being different from the first sidelink control information. The method may further include receiving, from the second UE, a reverse sidelink message in response to transmitting the second sidelink control information.

An apparatus is described. The apparatus may include a processor, and memory coupled to the processor, the processor and memory configured to transmit, to a second UE via a sidelink communication link, a first sidelink control information including a reverse sidelink scheduling indicator. The processor and memory may be further configured to cause the apparatus to transmit, to the second UE via the sidelink communication link, a second sidelink control information indicating a set of resources for reverse sidelink transmissions from the second UE to the first UE over the sidelink communication link, where transmitting the second sidelink control information is based on transmitting the first sidelink control information, the second sidelink control information being different from the first sidelink control information. The processor and memory may be further configured to cause the apparatus to receive, from the second UE, a reverse sidelink message in response to transmitting the second sidelink control information.

Another apparatus is described. The apparatus may include means for transmitting, to a second UE via a sidelink communication link, a first sidelink control information including a reverse sidelink scheduling indicator, and means for transmitting, to the second UE via the sidelink communication link, a second sidelink control information indicating a set of resources for reverse sidelink transmissions from the second UE to the first UE over the sidelink communication link, where transmitting the second sidelink control information is based on transmitting the first sidelink control information, the second sidelink control information being different from the first sidelink control information. The apparatus may further include means for receiving, from the second UE, a reverse sidelink message in response to transmitting the second sidelink control information.

A non-transitory computer-readable medium storing code is described. The code may include instructions executable by a processor to transmit, to a second UE via a sidelink communication link, a first sidelink control information including a reverse sidelink scheduling indicator. The processor and memory may be further configured to transmit, to the second UE via the sidelink communication link, a second sidelink control information indicating a set of resources for reverse sidelink transmissions from the second UE to the first UE over the sidelink communication link, where transmitting the second sidelink control information is based on transmitting the first sidelink control information, the second sidelink control information being different from the first sidelink control information. The processor and memory may be further configured to receive, from the second UE, a reverse sidelink message in response to transmitting the second sidelink control information.

A method is described. The method may include receiving, from a second UE via a sidelink communication link between the first UE and the second UE, a first sidelink control information including a reverse sidelink scheduling indicator. The method may further include receiving, from the second UE via the sidelink communication link, a second sidelink control information indicating a set of resources for reverse sidelink transmissions from the first UE to the second UE over the sidelink communication link, where receiving the second sidelink control information is based on receiving the first sidelink control information, the second sidelink control information being different from the first sidelink control information. The method may further include transmitting, to the second UE, a reverse sidelink message in response to receiving the second sidelink control information.

An apparatus is described. The apparatus may include a processor, and memory coupled to the processor, the processor and memory configured to receive, from a second UE via a sidelink communication link between the first UE and the second UE, a first sidelink control information including a reverse sidelink scheduling indicator. The processor and memory may be further configured to cause the apparatus to receive, from the second UE via the sidelink communication link, a second sidelink control information indicating a set of resources for reverse sidelink transmissions from the first UE to the second UE over the sidelink communication link, where receiving the second sidelink control information is based on receiving the first sidelink control information, the second sidelink control information being different from the first sidelink control information. The processor and memory may be further configured to cause the apparatus to transmit, to the second UE, a reverse sidelink message in response to receiving the second sidelink control information.

Another apparatus is described. The apparatus may include means for receiving, from a second UE via a sidelink communication link between the first UE and the second UE, a first sidelink control information including a reverse sidelink scheduling indicator. The apparatus may further include means for receiving, from the second UE via the sidelink communication link, a second sidelink control information indicating a set of resources for reverse sidelink transmissions from the first UE to the second UE over the sidelink communication link, where receiving the second sidelink control information is based on receiving the first sidelink control information, the second sidelink control information being different from the first sidelink control information. The apparatus may further include means for transmitting, to the second UE, a reverse sidelink message in response to receiving the second sidelink control information.

A non-transitory computer-readable medium storing code is described. The code may include instructions executable by a processor to receive, from a second UE via a sidelink communication link between the first UE and the second UE, a first sidelink control information including a reverse sidelink scheduling indicator. The processor and memory may be further configured to receive, from the second UE via the sidelink communication link, a second sidelink control information indicating a set of resources for reverse sidelink transmissions from the first UE to the second UE over the sidelink communication link, where receiving the second sidelink control information is based on receiving the first sidelink control information, the second sidelink control information being different from the first sidelink control information. The processor and memory may be further configured to transmit, to the second UE, a reverse sidelink message in response to receiving the second sidelink control information.

A method of wireless communication at a first UE is described. The method may include determining a first set of resources for communications over a sidelink communication link between the first UE and a second UE, and transmitting, to the second UE via the sidelink communication link, a first SCI including a reverse sidelink scheduling indicator based on determining the first set of resources. The method may additionally include transmitting, to the second UE via the sidelink communication link, a second SCI indicating a second set of resources for reverse sidelink transmissions from the second UE to the first UE over the sidelink communication link, where transmitting the second SCI is based on transmitting the first SCI, and receiving, from the second UE, a reverse sidelink message in response to transmitting the second SCI.

An apparatus for wireless communication at a first UE is described. The apparatus may include a processor, memory coupled with the processor, the processor and memory configured to determine a first set of resources for communications over a sidelink communication link between the first UE and a second UE, and transmit, to the second UE via the sidelink communication link, a first SCI including a reverse sidelink scheduling indicator based on determining the first set of resources. The processor and memory may be further configured to transmit, to the second UE via the sidelink communication link, a second SCI indicating a second set of resources for reverse sidelink transmissions from the second UE to the first UE over the sidelink communication link, where transmitting the second SCI is based on transmitting the first SCI, and receive, from the second UE, a reverse sidelink message in response to transmitting the second SCI.

Another apparatus for wireless communication at a first UE is described. The apparatus may include means for determining a first set of resources for communications over a sidelink communication link between the first UE and a second UE, and means for transmitting, to the second UE via the sidelink communication link, a first SCI including a reverse sidelink scheduling indicator based on determining the first set of resources. The apparatus may further include means for transmitting, to the second UE via the sidelink communication link, a second SCI indicating a second set of resources for reverse sidelink transmissions from the second UE to the first UE over the sidelink communication link, where transmitting the second SCI is based on transmitting the first SCI, and means for receiving, from the second UE, a reverse sidelink message in response to transmitting the second SCI.

A non-transitory computer-readable medium storing code for wireless communication at a first UE is described. The code may include instructions executable by a processor to determine a first set of resources for communications over a sidelink communication link between the first UE and a second UE, and transmit, to the second UE via the sidelink communication link, a first SCI including a reverse sidelink scheduling indicator based on determining the first set of resources. The processor and memory may be further configured to transmit, to the second UE via the sidelink communication link, a second SCI indicating a second set of resources for reverse sidelink transmissions from the second UE to the first UE over the sidelink communication link, where transmitting the second SCI is based on transmitting the first SCI, and receive, from the second UE, a reverse sidelink message in response to transmitting the second SCI.

Some examples of the method, apparatuses, and non-transitory computer-readable medium described herein may further include operations, features, means, or instructions for transmitting, via the sidelink communication link, a sidelink grant indicating the second set of resources for reverse sidelink transmissions from the second UE to the first UE, where receiving the reverse sidelink message may be based on receiving sidelink grant.

Some examples of the method, apparatuses, and non-transitory computer-readable medium described herein may further include operations, features, means, or instructions for transmitting, via at least one of the first SCI or the second SCI, an indication of an MCS associated with the reverse sidelink message, where receiving the reverse sidelink message may be based on transmitting the indication of the MCS.

Some examples of the method, apparatuses, and non-transitory computer-readable medium described herein may further include operations, features, means, or instructions for transmitting, via the second SCI, an indication of a redundancy version associated with the reverse sidelink message, where receiving the reverse sidelink message may be based on transmitting the indication of the redundancy version.

Some examples of the method, apparatuses, and non-transitory computer-readable medium described herein may further include operations, features, means, or instructions for transmitting, via the second SCI, an indication of a request for the second UE to transmit a new reverse sidelink message, retransmit a previous reverse sidelink message, or both, where receiving the reverse sidelink message may be in response to transmitting the indication of the request.

Some examples of the method, apparatuses, and non-transitory computer-readable medium described herein may further include operations, features, means, or instructions for transmitting, via the second SCI, a hybrid automatic repeat request (HARQ) process identifier associated with the reverse sidelink transmissions from the second UE to the first UE.

Some examples of the method, apparatuses, and non-transitory computer-readable medium described herein may further include operations, features, means, or instructions for transmitting, to the second UE, a feedback message in response to receiving the reverse sidelink message and the HARQ process identifier.

Some examples of the method, apparatuses, and non-transitory computer-readable medium described herein may further include operations, features, means, or instructions for receiving, from the second UE, a third SCI, a fourth SCI, or both, where receiving the reverse sidelink message may be based on receiving the third SCI, the fourth SCI, or both.

Some examples of the method, apparatuses, and non-transitory computer-readable medium described herein may further include operations, features, means, or instructions for monitoring the second set of resources associated with the reverse sidelink transmissions from the second UE to the first UE based on transmitting the second SCI, where receiving the reverse sidelink message may be based on monitoring the second set of resources.

Some examples of the method, apparatuses, and non-transitory computer-readable medium described herein may further include operations, features, means, or instructions for transmitting, via the second SCI, an indication of a first identifier associated with the first UE and a second identifier associated with the second UE, where receiving the reverse sidelink message may be based on the indication of the first identifier and the indication of the second identifier.

In some examples of the method, apparatuses, and non-transitory computer-readable medium described herein, the second set of resources include a set of time resources and a set of frequency resources allocated for the reverse sidelink transmissions from the second UE to the first UE over the sidelink communication link.

Some examples of the method, apparatuses, and non-transitory computer-readable medium described herein may further include operations, features, means, or instructions for transmitting the first SCI via a PSCCH, and transmitting the second SCI via a PSSCH.

In some examples of the method, apparatuses, and non-transitory computer-readable medium described herein, the first SCI includes a first type of SCI, and where the second SCI includes a second type of SCI different from the first type of SCI.

In some examples of the method, apparatuses, and non-transitory computer-readable medium described herein, the first SCI includes a first-stage SCI, and where the second SCI includes a second-stage SCI.

In some examples of the method, apparatuses, and non-transitory computer-readable medium described herein, the reverse sidelink scheduling indicator may be indicated in a bit field of the first SCI.

A method of wireless communication at a first UE is described. The method may include receiving, from a second UE via a sidelink communication link between the first UE and the second UE, a first SCI including a reverse sidelink scheduling indicator, receiving, from the second UE via the sidelink communication link, a second SCI indicating a set of resources for reverse sidelink transmissions from the first UE to the second UE over the sidelink communication link, where receiving the second SCI is based on receiving the first SCI, and transmitting, to the second UE, a reverse sidelink message in response to receiving the second SCI.

An apparatus for wireless communication at a first UE is described. The apparatus may include a processor, memory coupled with the processor, the processor and memory configured to receive, from a second UE via a sidelink communication link between the first UE and the second UE, a first SCI including a reverse sidelink scheduling indicator. The processor and memory may be further configured to receive, from the second UE via the sidelink communication link, a second SCI indicating a set of resources for reverse sidelink transmissions from the first UE to the second UE over the sidelink communication link, where receiving the second SCI is based on receiving the first SCI, and transmit, to the second UE, a reverse sidelink message in response to receiving the second SCI.

Another apparatus for wireless communication at a first UE is described. The apparatus may include means for receiving, from a second UE via a sidelink communication link between the first UE and the second UE, a first SCI including a reverse sidelink scheduling indicator. The apparatus may further include means for receiving, from the second UE via the sidelink communication link, a second SCI indicating a set of resources for reverse sidelink transmissions from the first UE to the second UE over the sidelink communication link, where receiving the second SCI is based on receiving the first SCI, and means for transmitting, to the second UE, a reverse sidelink message in response to receiving the second SCI.

A non-transitory computer-readable medium storing code for wireless communication at a first UE is described. The code may include instructions executable by a processor to receive, from a second UE via a sidelink communication link between the first UE and the second UE, a first SCI including a reverse sidelink scheduling indicator. The processor and memory may be further configured to receive, from the second UE via the sidelink communication link, a second SCI indicating a set of resources for reverse sidelink transmissions from the first UE to the second UE over the sidelink communication link, where receiving the second SCI is based on receiving the first SCI, and transmit, to the second UE, a reverse sidelink message in response to receiving the second SCI.

Some examples of the method, apparatuses, and non-transitory computer-readable medium described herein may further include operations, features, means, or instructions for receiving, via the sidelink communication link, a sidelink grant indicating the second set of resources for reverse sidelink transmissions from the second UE to the first UE, where transmitting the reverse sidelink message may be based on receiving sidelink grant.

Some examples of the method, apparatuses, and non-transitory computer-readable medium described herein may further include operations, features, means, or instructions for receiving, via at least one of the first SCI or the second SCI, an indication of a MCS associated with the reverse sidelink message, where transmitting the reverse sidelink message may be based on receiving the indication of the MCS.

Some examples of the method, apparatuses, and non-transitory computer-readable medium described herein may further include operations, features, means, or instructions for receiving, via the second SCI, an indication of a redundancy version associated with the reverse sidelink message, where transmitting the reverse sidelink message may be based on receiving the indication of the redundancy version.

Some examples of the method, apparatuses, and non-transitory computer-readable medium described herein may further include operations, features, means, or instructions for receiving, via the second SCI, an indication of a request for the second UE to transmit a new reverse sidelink message, retransmit a previous reverse sidelink message, or both, where transmitting the reverse sidelink message may be in response to receiving the indication of the request.

Some examples of the method, apparatuses, and non-transitory computer-readable medium described herein may further include operations, features, means, or instructions for receiving, via the second SCI, a HARQ process identifier associated with the reverse sidelink transmissions from the first UE to the second UE.

Some examples of the method, apparatuses, and non-transitory computer-readable medium described herein may further include operations, features, means, or instructions for receiving, from the second UE, a feedback message in response to transmitting the reverse sidelink message and the HARQ process identifier.

Some examples of the method, apparatuses, and non-transitory computer-readable medium described herein may further include operations, features, means, or instructions for transmitting, to the second UE, a third SCI, a fourth SCI, or both, where transmitting the reverse sidelink message may be based on transmitting the third SCI, the fourth SCI, or both.

Some examples of the method, apparatuses, and non-transitory computer-readable medium described herein may further include operations, features, means, or instructions for receiving, via the second SCI, an indication of a first identifier associated with the first UE and a second identifier associated with the second UE, where transmitting the reverse sidelink message may be based on the indication of the first identifier and the indication of the second identifier.

In some examples of the method, apparatuses, and non-transitory computer-readable medium described herein, the set of resources include a set of time resources and a set of frequency resources allocated for the reverse sidelink transmissions from the first UE to the second UE over the sidelink communication link.

Some examples of the method, apparatuses, and non-transitory computer-readable medium described herein may further include operations, features, means, or instructions for receiving the first SCI via a PSCCH, and receiving the second SCI via a PSSCH.

In some examples of the method, apparatuses, and non-transitory computer-readable medium described herein, the first SCI includes a first type of SCI, and where the second SCI includes a second type of SCI different from the first type of SCI.

In some examples of the method, apparatuses, and non-transitory computer-readable medium described herein, the first SCI includes a first-stage SCI, and where the second SCI includes a second-stage SCI.

In some examples of the method, apparatuses, and non-transitory computer-readable medium described herein, the reverse sidelink scheduling indicator may be indicated in a bit field of the first SCI.

DETAILED DESCRIPTION

Figure 1:
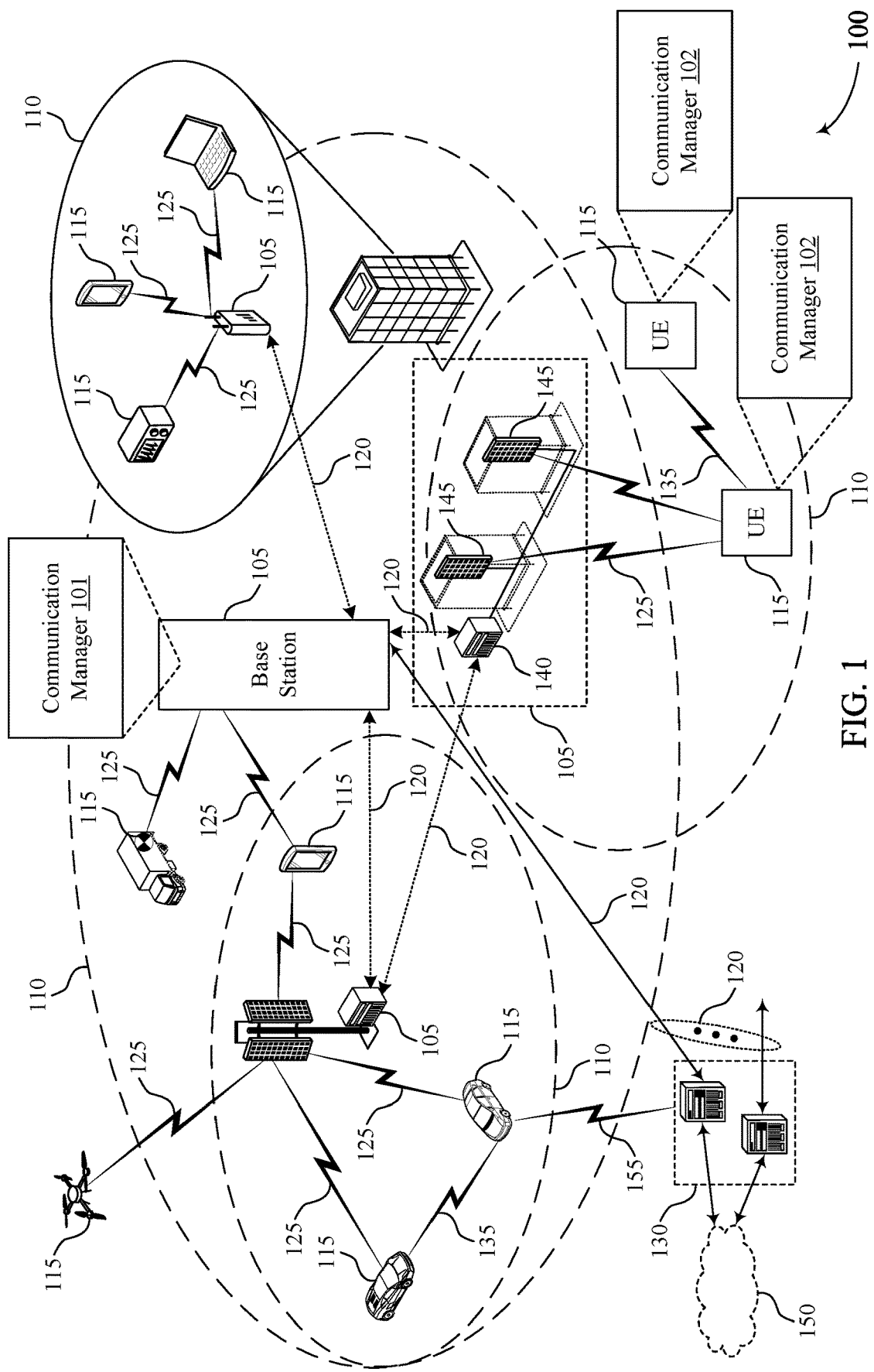
FIG. 1 illustrates an example of a wireless communications system that supports techniques for dynamic scheduling of reverse sidelink traffic in accordance with one or more aspects of the present disclosure.

Wireless systems may support access links (e.g., a Uu link) and sidelinks (e.g., sidelink communication link, a PC5 link, or other link between wireless devices) for communications between wireless devices. Access links may refer to communication links through which a UE accesses a wireless communications system, such as a communication link between a UE and a base station. Comparatively, sidelinks may refer to communication links between UEs, such as a communication link between a first UE and a second UE. In some cases, a base station may transmit grants (e.g., dynamic grants, configured grants) which indicate time and frequency resources allocated for sidelink communications over a sidelink communication link between a first UE and a second UE. However, in some wireless communications systems, the base station may schedule sidelink transmissions from each UE separately. For example, to schedule a sidelink transmission from a first UE to a second UE, a base station may transmit a grant to the first UE indicating time and frequency resources for the sidelink transmission to the second UE. Similarly, to schedule a sidelink transmission from the second UE to the first UE, the base station may transmit a grant to the second UE indicating time and frequency resources for the sidelink transmission to the first UE. However, scheduling the sidelink transmissions from the first UE and the second UE separately may increase control signaling overhead and resource usage. Additionally, scheduling sidelink transmissions with each UE separately may require access procedures and/or setup procedures between each respective UE and the base station, further increasing the control signaling overhead and resource usage within the wireless communications system. Further, low-complexity or low-capability UEs may not have a sophisticated understanding of traffic within a sidelink network and may therefore cause interference within the sidelink network when they receive grants directly from the base station and schedule their own sidelink transmissions based on the received grants. For the purposes of the present disclosure, the terms "low-complexity UEs," "low-capability UEs," and like terms, may be used to refer to UEs which exhibit inferior processing capabilities, inferior channel knowledge, or the like, as compared to "high-complexity UEs" or "high-capability UEs." In this regard, these terms are to be regarded as relative terms which are used to help explain features described herein.

Techniques described herein are directed to signaling for dynamic scheduling of reverse sidelink traffic. In particular, techniques described herein enable a first UE to dynamically schedule sidelink traffic from a second UE to the first UE (e.g., schedule reverse sidelink traffic). By enabling UEs to schedule sidelink communications at other UEs, techniques described herein may reduce control signaling overhead associated with control signaling from a base station For the purposes of the present disclosure, the terms "sidelink traffic," "sidelink messages," and like terms, and "reverse sidelink traffic," "reverse sidelink messages," and like terms, may refer to the direction of sidelink transmissions from the perspective of a UE which schedules the sidelink transmissions. For example, from the perspective of a first UE (e.g., a "scheduling" UE), sidelink messages may refer to sidelink transmissions which are transmitted from the first UE to a second UE. Comparatively, reverse sidelink messages may refer to sidelink transmissions which are transmitted from the second UE to the first UE.

According to some aspects of the present disclosure, a first UE may transmit SCI to a second UE, where the SCI schedules a reverse sidelink transmission from the second UE to the first UE. For example, a first UE may receive a grant from a base station which indicates a first set of resources allocated for sidelink transmissions between the first UE and the second UE. In this example, the first UE may transmit one or more SCIs to the second UE which indicate a second set of resources which are allocated for reverse sidelink transmissions from the second UE to the first UE. In some cases, an SCI (e.g., first-stage SCI/SCI 0-1, or second-stage SCI/SCI0-2) may include a reverse sidelink scheduling indicator which indicates, to the second UE, the dynamic scheduling of reverse sidelink traffic by the first UE. The reverse sidelink scheduling indicator may be indicated in a bit field of the SCI. For the purposes of the present disclosure, the term "reverse sidelink scheduling indicator" may refer to any indicator or bit field value used to indicate dynamic scheduling of reverse sidelink traffic.

In some aspects, a second or additional SCI (e.g., second-stage SCI, or SCI 0-2) may indicate various parameters associated with the scheduled reverse sidelink transmissions. Parameters associated with reverse sidelink transmissions may include a modulation and coding scheme (MCS), a redundancy version, a hybrid automatic repeat request (HARM) process identifier, and the like. In additional or alternative implementations, the second SCI may include the reverse sidelink scheduling indicator. Subsequently, the second UE may transmit a reverse sidelink message to the first UE based on the reverse sidelink scheduling indicator indicated in the first SCI, the second SCI, or both, and the one or more parameters indicated in the second SCI. By enabling UEs to schedule reverse sidelink transmissions from other UEs, control signaling overhead within the wireless communications system may be reduced. Additionally, techniques described herein may enable higher-complexity UEs to schedule reverse sidelink transmissions from lower-complexity UEs, thereby reducing potential interference and improving wireless signaling reliability.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for dynamic scheduling of reverse sidelink traffic.

FIG. 1 illustrates an example of a wireless communications system 100 that supports techniques for dynamic scheduling of reverse sidelink traffic in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 may include communication managers 101. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1. The UEs 115 may include communication managers 102.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). In some aspects, the communication link 135 may include an example of a sidelink communication link 135 (e.g., PC5 link). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, which may be in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support techniques for dynamic scheduling of reverse sidelink traffic, which may reduce control signaling overhead and improve reliability of sidelink communications within the wireless communications system 100. For example, a base station 105 of the wireless communications system 100 may transmit a grant to a first UE 115-*a*, where the first grant indicates a first set of resources allocated for sidelink transmissions between the first UE 115-*a* and a second UE 115-*b* of the wireless communications system 100. In this example, the first UE 115-*a* may transmit one or more SCIs to the second UE 115-*b* which indicate a second set of resources (e.g., subset of the first set of resources) which are allocated for reverse sidelink transmissions from the second UE 115-*b* to the first UE 115-*a*. Moreover, the one or more SCIs may include a reverse sidelink scheduling indicator which indicates, to the second UE 115-*b*, the dynamic scheduling of reverse sidelink traffic. The reverse sidelink scheduling indicator may be indicated in a bit field of the one or more SCIs.

For example, in some cases, a first SCI (e.g., first-stage SCI, or SCI 0-1) may indicate a first set of resources usable by the second UE 115-*b* for receiving a second SCI, transmitting a reverse sidelink message from the second UE 115-*b* to the first UE 115-*a*, or both. In this example, a second SCI (e.g., second-stage SCI, or SCI 0-2) may include a reverse sidelink scheduling indicator which indicates, to the second UE 115-*b*, the dynamic scheduling of reverse sidelink traffic. The reverse sidelink scheduling indicator may be indicated in a bit field of the second SCI. The second SCI may further indicate various parameters associated with the scheduled reverse sidelink transmissions. Parameters associated with reverse sidelink transmissions may include an MCS, a redundancy version, a HARQ process identifier, and the like. Subsequently, the second UE 115-*b* may transmit a reverse sidelink message to the first UE 115-*a* based on the reverse sidelink scheduling indicator indicated in the first SCI and the one or more parameters indicated in the second SCI.

Techniques described herein may enable UEs 115 to schedule reverse sidelink transmissions from other UEs 115, thereby reducing control signaling overhead within the wireless communications system 100. Additionally, techniques described herein may enable higher-complexity UEs 115 (e.g., the first UE 115-*a*) to schedule reverse sidelink transmissions from lower-complexity UEs 115 (e.g., the second UE 115-*b*), thereby reducing potential interference and improving wireless signaling reliability.

Figure 2:
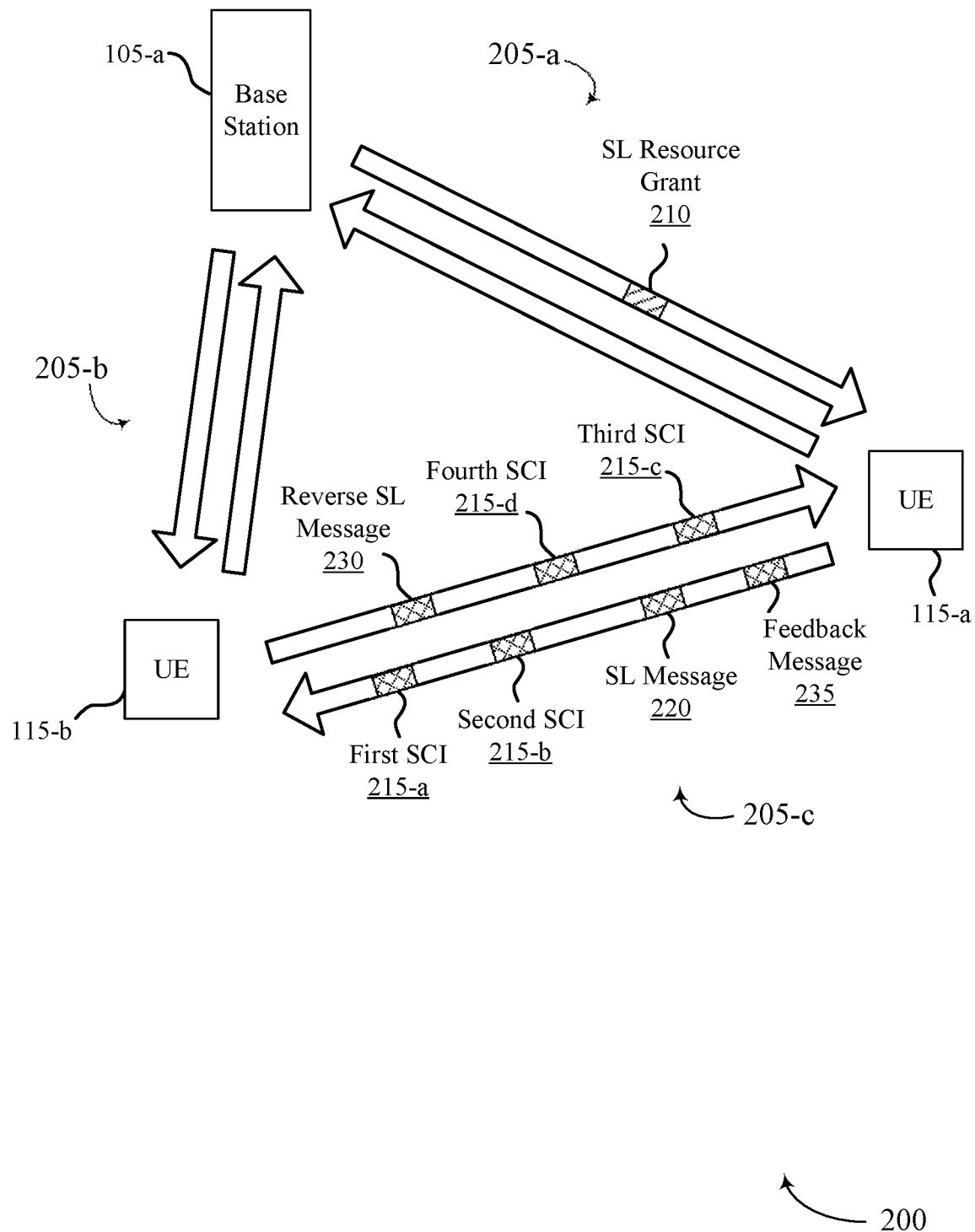
FIG. 2 illustrates an example of a wireless communications system that supports techniques for dynamic scheduling of reverse sidelink traffic in accordance with one or more aspects of the present disclosure.

FIG. 2 illustrates an example of a wireless communications system 200 that supports techniques for dynamic scheduling of reverse sidelink traffic in accordance with one or more aspects of the present disclosure. In some examples, wireless communications system 200 may implement aspects of wireless communications system 100. The wireless communications system 200 may include a first UE 115-*a*, a second UE 115-*b*, and a base station 105-*a*, which may be examples of UEs 115 and base stations 105, as described with reference to FIG. 1. Wireless communications system 200 may support the signaling of dynamic scheduling of reverse sidelink traffic.

In some aspects, FIG. 2 may illustrate an example wireless communications system 200 in the context of a wireless factory automation system. For example, in the context of a wireless factory automation system (e.g., wireless communications system 200), the base station 105-*a* may be mounted on a ceiling of a factory such that it may communicate with various wireless devices (e.g., first UE 115-*a* and second UE 115-*b*) within the factory. In this example, in some cases, the first UE 115-*a* may include a wireless programmable logic controller (PLC), and the second UE 115-*b* may include a wireless sensor/actuator (S/A). Accordingly, the PLC (e.g., first UE 115-*a*) may communicate with the base station 105-*a* via a Uu link (e.g., communication link 205-*a*), and the S/A (e.g., second UE 115-*b*) may communicate with the PLC (e.g., first UE 115-*a*) via a PC5 link (e.g., communication link 205-*c*). In this example, the first UE 115-*a* (e.g., PLC) may be mounted close to machinery and may be configured to communicate with a set of S/As (e.g., second UE 115-*b*) and/or other wireless devices. In some cases, a single factory may include 100-1000 PLCs, and each PLC may be communicatively coupled to 20-50 S/As.

In some cases, the various wireless devices within a factory may exhibit varying complexity or sophistication. For example, the first UE 115-*a* (e.g., PLC) may include a higher-complexity wireless device as compared to the second UE 115-*b* (e.g., S/A) which may include a lower-complexity wireless device. As it is used herein, the term "higher-complexity device" may be used to refer to a wireless device which exhibits superior processing capabilities, superior channel knowledge of channels within the wireless communications system 200, or both, as compared to a "lower-complexity device."

The first UE 115-*a* and the second UE 115-*b* may communicate with the base station 105-*a* using a communication link 205-*a* and a communication link 205-*b*, respectively, which may be examples of NR or LTE links between the first UE 115-*a* and the second UE 115-*b*, respectively, and the base station 105-*a*. In some cases, the communication link 205-*a* and the communication link 205-*b* may include examples of access links (e.g., Uu links). The communication link 205-*a* and communication link 205-*b* may include bi-directional links that enable both uplink and downlink communication. For example, the first UE 115-*a* may transmit uplink signals, such as uplink control signals or uplink data signals, to the base station 105-*a* using the first communication link 205-*a* and the base station 105-*a* may transmit downlink signals, such as downlink control signals or downlink data signals, to the first UE 115-*a* using the communication link 205-*a*. By way of another example, the second UE 115-*b* may transmit uplink signals, such as uplink control signals or uplink data signals, to the base station 105-*a* using the first communication link 205-*b* and the base station 105-*a* may transmit downlink signals, such as downlink control signals or downlink data signals, to the second UE 115-*b* using the communication link 205-*b*. The first UE 115-*a* and the second UE 115-*b* may communicate with one another via a communication link 205-*c*. In some cases, the communication link 205-*c* may include an example of a link between two UEs 115 (e.g., a sidelink communication link, or PC5 link).

In some aspects, the communication link 205-*c* between the first UE 115-*a* and the second UE 115-*b* (e.g., sidelink communication link) may be included within a sidelink network of the wireless communications system 200. The sidelink network (e.g., sidelink network including the communication link 205-*c*) may be configurable to operate in a "Mode 1" and/or a "Mode 2." While operating in Mode 1, the sidelink network (e.g., communication link 205-*c*, or sidelink communication link) may be managed (e.g., coordinated) by the base station 105-*a*. In this regard, during Mode 1 operation, the base station 105-*a* may manage resource allocation over the communication link 205-*c*.

For example, during Mode 1 operation, the base station 105-*a* may schedule sidelink resources by transmitting grants (e.g., dynamic grants, configured grants) to each of the first UE 115-*a* and the second UE 115-*b*. For instance, the first UE 115-*a* and the second UE 115-*b* may be preconfigured to perform sidelink transmissions using a configured grant, which may be activated via radio resource control (RRC) signaling from the base station 105-*a*. By way of another example, the base station 105-*a* may schedule sidelink transmissions via downlink control information (DCI), where the DCI includes a dynamic grant which indicates sidelink resources for sidelink transmissions. In some cases, the first UE 115-*a* and the second UE 115-*b* may report activation or deactivation of a grant (e.g., configured grant, dynamic grant) by transmitting MAC-CE messages to the base station 105-*a*.

Operating the sidelink communication link (e.g., communication link 205-*c*) according to Mode 1 may allow for the base station 105-*a* to coordinate and manage sidelink communications. However, in some cases, operating the sidelink communication link (e.g., communication link 205-*c*) according to Mode 1 may result in excess control signaling overhead. For example, in some wireless communications systems, the base station 105-*a* may transmit control signaling (e.g., configured grant, dynamic grant) to the first UE 115-*a* in order to schedule sidelink transmissions from the first UE 115-*a*, and may transmit additional control signaling to the second UE 115-*b* in order to schedule sidelink transmissions from the second UE 15-*b*. By scheduling sidelink transmissions from each of the first UE 115-*a* and the second UE 115-*b* individually, control signaling to and from the base station 105-*a* may be increased, potentially leading to increased latency and less reliable wireless communications.

Comparatively, while operating the sidelink communication link (e.g., communication link 205-*c*) according to Mode 2, the sidelink network (e.g., communication link 205-*c*, or sidelink communication link) may not be managed (e.g., may not be coordinated) by the base station 105-*a*. Without coordination or management of the resources of the sidelink network during the Mode 2 operation, the UEs 115 (e.g., first UE 115-*a*, second UE 115-*b*, additional UEs 115) of the wireless communications system 200 may follow contention-based access procedures in which the various UEs 115 may "compete" for the use of the sidelink network, including the communication link 205-*c*. For example, during Mode 2 operation, the first UE 115-*a* and the second UE 115-*b* may monitor the sidelink network of the wireless communications system 200 to determine if other UEs 115 are attempting to transmit over the sidelink network. For instance, the first UE 115-*a* and the second UE 115-*b* may monitor the sidelink network for transmissions (e.g., SCI 0-1, request-to-send messages) transmitted by other UEs 115, and may transmit messages (e.g., SCI 0-1, request-to-send messages) to compete for (e.g., claim) use of the sidelink network (e.g., communication link 205-*c*).

However, in the context of Mode 2 sidelink operation, each of the first UE 115-*a* and the second UE 115-*a* may monitor the sidelink network in order to schedule their own sidelink transmissions. In the case where the second UE 115-*b* includes a lower-complexity device (e.g., S/A), the second UE 115-*b* may not have a sophisticated understanding of traffic within the sidelink network of the wireless communications system 200. Accordingly, sidelink transmissions from the second UE 15-*b* which are scheduled by the second UE 115-*b* may result in increased interference, and less reliable wireless communications.

Accordingly, the wireless communications system 200 may support techniques for dynamic scheduling of reverse sidelink traffic which reduce control signaling overhead associated with Mode 1 operation, and reduce the need for lower-complexity devices to schedule their own sidelink transmissions as is the case in Mode 2 operation. In particular, techniques described herein may support signaling which allows the first UE 115-*a* to schedule reverse sidelink transmissions from the second UE 115-*b* to the first UE 115-*a*. By enabling the first UE 115-*a* to schedule reverse sidelink transmissions from the second UE 115-*b*, control signaling from the base station 105-*a* for sidelink message scheduling may be reduced. Additionally, in cases where the first UE 115-*a* is a higher-complexity device as compared to the second UE 115-*b*, the first UE 115-*a* may exhibit a more sophisticated understanding of the sidelink channel (e.g., communication link 205-*c*) and the sidelink network of the wireless communications system 200, thereby reducing interference and enabling more efficient and reliable sidelink communications.

For example, in some aspects, the base station 105-*a* may transmit a grant (e.g., sidelink resource grant 210) to the first UE 115-*a*. The sidelink resource grant 210 may indicate a first set of resources (e.g., time resources, frequency resources) for communications over the sidelink communication link (e.g., communication link 205-*c*) between the first UE 115-*a* and the second UE 115-*b*. In some aspects, the first UE 115-*a* may determine the first set of resources for communications over the sidelink communication link (e.g., communication link 205-*c*) between the first UE 115-*a* and the second UE 115-*b* based on the sidelink resource grant 210.

Additionally, in some aspects, the first UE 115-*a* may determine a second set of resources for reverse sidelink transmissions over the sidelink communication link (e.g., communication link 205-*c*) from the second UE 115-*b* to the first UE 115-*a*. In other words, the first UE 115-*a* may determine a set of resources for a reverse sidelink message 230 from the second UE 115-*b* to the first UE 115-*a*. In some aspects, the first UE 115-*a* may determine the second set of resources based on the sidelink resource grant 210 received from the base station 105-*a*. In some cases, the second set of resources allocated for reverse sidelink transmissions may include a subset of the first set of resources allocated for sidelink transmissions over the sidelink communication link 205-*c* between the first UE 115-*a* and the second UE 115-*b*. In this regard, the first UE 115-*a* may determine the second set of resources based on the first set of resources. In additional or alternative aspects, the second set of resources may not be a subset of the first set of resources, and the first UE 115-*a* may determine the second set of resources independently from the first set of resources.

In some implementations, the first UE 115-*a* may determine the set of resources for the reverse sidelink message 230 and/or schedule the reverse sidelink message 230 based on a knowledge that the second UE 115-*b* includes data to be transmitted to the first UE 115-*a*. For example, the first UE 115-*a* may receive a sidelink transmission from the second UE 115-*b*, where one or more packets of the sidelink transmission are dropped, or otherwise not successfully received/decoded by the first UE 115-*a*. The sidelink transmission with the dropped packet may be included in a configuration for semi-persistently scheduled (SPS) reverse sidelink messages (e.g., reverse SPS). In this example, the first UE 115-*a* may determine that the second UE 115-*b* includes data to be transmitted to the first UE 115-*a*, which may trigger the reverse sidelink scheduling techniques described herein. Thus, the dynamic reverse sidelink scheduling techniques described herein may enable the second UE 115-*b* to re-transmit at least a portion of the reverse sidelink transmission.

In some aspects, the first UE 115-*a* may transmit a first SCI 215-*a* to the second UE 115-*b*. The first UE 115-*a* may transmit the first SCI 215-*a* via the sidelink communication link (e.g., communication link 205-*c*) between the first UE 115-a and the second UE 115-b based on receiving the sidelink resource grant 210, determining the first set of resources, determining the second set of resources, or any combination thereof. In some aspects, the first SCI 215-a may indicate a second set of resources (e.g., time resources, frequency resources) for reverse sidelink messages 230 from the second UE 115-b to the first UE 115-a. In some aspects, the first SCI 215-a may include a reverse sidelink scheduling indicator. The reverse sidelink scheduling indicator may be configured to indicate, to the second UE 115-b, dynamic scheduling of reverse sidelink traffic from the second UE 115-b by the first UE 115-a. In some cases, the first SCI 215-a may include a first type of SCI 215 or a second type of SCI 215. For example, the first SCI 215-a may include a first-stage SCI (e.g., SCI 0-1) or a second-stage SCI (e.g., SCI 0-2).

In some aspects, the reverse sidelink scheduling indicator may be indicated in a bit field of the first SCI 215-a. In this regard, a first value in the bit field of the first SCI 215-a may indicate that that the first UE 115-a is scheduling reverse sidelink traffic from the second UE 115-b, and a second value in the bit field of the first SCI 215-a may indicate that that the first UE 115-a is not scheduling reverse sidelink traffic from the second UE 115-b. In this regard, the reverse sidelink scheduling indicator may effectively be used to dynamically enable or disable reverse sidelink scheduling by the first UE 115-a. In some aspects, the first SCI 215-a may be transmitted via a physical sidelink control channel (PSCCH).

In some cases, the first SCI 215-a may additionally include an indication of one or more parameters associated with reverse sidelink transmissions. Parameters associated with reverse sidelink messages 230 which may be indicated in the first SCI 215-a may include, but are not limited to, a priority, time/frequency resources, a resource reservation period, a demodulation reference signal (DMRS) pattern, a quantity of DMRS ports, an SCI format, a beta offset indicator, an MCS, and the like. For example, the first SCI 215-a may include an indication of an MCS associated with reverse sidelink messages 230 from the second UE 115-b.

The first UE 115-a may additionally transmit a second SCI 215-b to the second UE 115-b. The first UE 115-a may transmit the second SCI 215-b via the sidelink communication link (e.g., communication link 205-c) between the first UE 115-a and the second UE 115-b based on receiving the sidelink resource grant 210, determining the first set of resources, determining the second set of resources, transmitting the first SCI 215-a, or any combination thereof. In some aspects, the second SCI 215-b may indicate the second set of resources (e.g., time resources, frequency resources) for reverse sidelink messages 230 from the second UE 115-b to the first UE 115-a. For example, the second SCI 215-b may include a sidelink grant (e.g., dynamic sidelink grant) indicating the second set of resources for reverse sidelink transmissions from the second UE 115-b to the first UE 115-a. Additionally or alternatively, the first UE 115-a may transmit the sidelink grant (e.g., dynamic sidelink grant) via a sidelink message or transmission which is different from the second SCI 215-b.

In some aspects, the second SCI 215-b may include a reverse sidelink scheduling indicator. The reverse sidelink scheduling indicator may be configured to indicate, to the second UE 115-b, dynamic scheduling of reverse sidelink traffic from the second UE 115-b by the first UE 115-a. In this regard, the reverse sidelink scheduling indicator may be indicated via the first SCI 215-a, the second SCI 215-b, or both.

In some cases, the second SCI 215-b may include a second type of SCI 215 that is different from the first type of SCI 215. For example, in some cases, the second SCI 215-b may include a second-stage SCI (e.g., SCI 0-2). In additional or alternative aspects, the second SCI 215-b may include an indication of one or more parameters associated with reverse sidelink messages 230 from the second UE 115-b. Parameters associated with reverse sidelink messages 230 which may be indicated in the second SCI 215-b may include, but are not limited to, an MCS, a redundancy version, a HARQ process identifier, a new data indicator, identifiers associated with the first UE 115-a and the second UE 115-b (e.g., source identifier, destination identifier), a channel state information (CSI) request, a zone identifier, a communication range requirement, and the like.

By way of another example, the second SCI 215-b may include a first identifier associated with the first UE 115-a and a second identifier associated with the second UE 115-b. In some cases, a source identifier may refer to the UE 115 which is to receive the reverse sidelink message 230 (e.g., first UE 115-a), while the destination identifier may refer to the UE 115 which is to transmit the reverse sidelink message 230 (e.g., second UE 115-b). In other cases, the source identifier may refer to the UE 115 which is to transmit the reverse sidelink message 230 (e.g., second UE 115-b), while the destination identifier may refer to the UE 115 which is to receive the reverse sidelink message 230 (e.g., first UE 115-a). Additionally or alternatively, the second SCI 215-b may include an indication of a request for the second UE 115-b to transmit a new reverse sidelink message 230, a request to retransmit a previously-transmitted reverse sidelink message 230, or both. In some aspects, the second SCI 215-b may be transmitted via PSSCH. In some aspects, the second UE 115-b may receive and/or decode the second SCI 215-b based on receiving the first SCI 215-a (e.g., based on data included within the first SCI 215-a).

In some aspects, the first UE 115-a may transmit a sidelink message 220 to the second UE 115-b. The first UE 115-a may transmit the sidelink message 220 via the sidelink communication link (e.g., communication link 205-c) between the first UE 115-a and the second UE 115-b. In some aspects, the first UE 115-a may transmit the sidelink message 220 in addition to the first SCI 215-a and/or the second SCI 215-b. In some aspects, the sidelink message 220 may be transmitted via PSSCH.

In some aspects, the first UE 115-a may monitor the second set of resources associated with reverse sidelink transmissions from the second UE 115-b to the first UE 115-a. In some aspects, the first UE 115-c may monitor the second set of resources based on determining the second set of resources, transmitting the first SCI 215-a, transmitting the second SCI 215-b, or any combination thereof. For example, the first UE 115-a may monitor the set of time resources and the set of frequency resources associated with the second set of resources in order to monitor for reverse sidelink messages 230 from the second UE 115-b.

The first UE 115-a may receive a third SCI 215-c, a fourth SCI 215-d, or both, from the second UE 115-b. In some cases, the first UE 115-a may receive the third SCI 215-c and/or the fourth SCI 215-d based on (e.g., in response to) transmitting the first SCI 215-a, transmitting the second SCI 215-b, monitoring the second set of resources, or any combination thereof. In some aspects, the third SCI 215-c may include the first type of SCI, and the fourth SCI 215-d may include the second type of SCI. For example, the third SCI 215-c may include a first-stage SCI (e.g., SCI 0-1), and the fourth SCI 215-d may include a second-stage SCI (e.g., SCI 0-2). In some aspects, the third SCI 215-*c* may be transmitted via PSCCH, and the fourth SCI 215-*d* may be transmitted via PSSCH. In some aspects, the third SCI 215-*c* and/or the fourth SCI 215-*d* may include indications of one or more parameters (e.g., time resources, frequency resources, MCS, redundancy version, HARQ process identifier) associated with reverse sidelink messages 230 transmitted from the second UE 115-*b* to the first UE 115-*a*, as will be discussed in further detail herein.

In some aspects, the first UE 115-*a* may receive a reverse sidelink message 230 from the second UE 115-*b*. The first UE 115-*b* may receive the reverse sidelink message 230 from the second UE 115-*b* via the sidelink communication link (e.g., communication link 205-*c*) between the first UE 115-*a* and the second UE 115-*b* based on (e.g., in response to) transmitting the first SCI 215-*a*, transmitting the second SCI 215-*b*, monitoring the second set of resources, receiving the third SCI 215-*c*, receiving the fourth SCI 215-*d*, or any combination thereof.

For example, in cases where the first SCI 215-*a* and/or the second SCI 215-*b* includes an indication of an MCS associated with reverse sidelink transmissions, the second UE 115-*b* may transmit the reverse sidelink message 230 based on the indicated MCS. By way of another example, in cases where there the second SCI 215-*b* indicates a redundancy version or a request to transmit the reverse sidelink message 230, the second UE 115-*b* may transmit the reverse sidelink message 230 based on the indicated redundancy version, the indicated request, or both. By way of another example, in cases where the second SCI 215-*b* includes an indication of a first identifier associated with the first UE 115-*a* and a second identifier associated with the second UE 115-*b*, the second UE 115-*b* may transmit the reverse sidelink message 230 based on the first identifier, the second identifier, or both. Additionally or alternatively, the second UE 115-*b* may transmit the sidelink message based on (e.g., responsive to) a sidelink grant (e.g., dynamic sidelink grant) indicated in the second SCI 215-*b* and/or alternative sidelink signaling.

As noted previously herein, the third SCI 215-*c* and/or the fourth SCI 215-*d* may indicate one or more parameters associated with the reverse sidelink message 230. In some cases, the second UE 115-*b* may transmit the reverse sidelink message 230 using the parameters associated with reverse sidelink traffic indicated by the first SCI 215-*a* and/or the second SCI 215-*b*. In this regard, the third SCI 215-*c* and/or the fourth SCI 215-*d* may indicate (e.g., mirror) the same parameters (e.g., time resources, frequency resources, MCS, redundancy version, HARQ process identifier) which were indicated in the first SCI 215-*a* and/or the second SCI 215-*b*. In some cases, the second UE 115-*b* may refrain from transmitting the third SCI 215-*c* and/or the fourth SCI 215-*d* when all fields/parameters associated with the reverse sidelink message 230 may be inferred (e.g., determined) by the dynamic scheduling of the reverse sidelink message 230 via the first SCI 215-*a* and/or the second SCI 215-*b*. It is noted herein, however, that other UEs 115 within the wireless communications system 200 may monitor a sidelink network for first-stage SCI (e.g., third SCI) in order to determine availability of the sidelink network when the sidelink network is operated in Mode 2. Accordingly, in some cases, the second UE 115-*b* may refrain from transmitting the fourth SCI 215-*d* when parameters of the reverse sidelink message 230 may be inferred, but may transmit the third SCI 215-*c* in order to allow other UEs 115 to perform sidelink channel sensing and selection.

Alternatively, in some cases, the second UE 115-*b* may select its own parameters (e.g., time resources, frequency resources, MCS, redundancy version, HARQ process identifier) with which to transmit the reverse sidelink message 230 which are different from those parameters indicated in the first SCI 215-*a* and/or the second SCI 215-*b*. In this regard, the parameters indicated in the first SCI 215-*a* and/or the second SCI 215-*b* may be regarded as "recommended" parameters for the second UE 115-*b* to use. In cases where the second UE 115-*b* selects parameters which are different from the recommended parameters indicated in the first SCI 215-*a* and/or the second SCI 215-*b*, the selected parameters may be indicated in the third SCI 215-*c* and/or the fourth SCI 215-*d*.

In some cases, the first UE 115-*a* may transmit a feedback message 235 to the second UE 115-*b*. The first UE 115-*c* may transmit the feedback message 235 based on (e.g., in response to) transmitting the first SCI 215-*a*, transmitting the second SCI 215-*b*, receiving the third SCI 215-*c*, receiving the fourth SCI 215-*d*, receiving the reverse sidelink message 230, or any combination thereof. In some cases, the first UE 115-*c* may transmit the feedback message 235 based on a HARQ process identifier indicated in the second SCI 215-*b* or the fourth SCI 215-*d*. For example, the first UE 115-*a* may transmit an acknowledgement (ACK) message or a negative-acknowledgement (NACK) message to the second UE 115-*b* based on (e.g., in response to) the HARQ process identifier indicated in the second SCI 215-*b*, receiving the reverse sidelink message 230, or both.

Techniques described herein may enable the first UE 115-*a* to schedule reverse sidelink transmissions from the second UE 115-*b*, thereby reducing control signaling overhead within the wireless communications system 200. Additionally, techniques described herein may enable higher-complexity UEs 115 (e.g., the first UE 115-*a*) to schedule reverse sidelink transmissions from lower-complexity UEs 115 (e.g., the second UE 115-*b*), thereby reducing potential interference and improving wireless signaling reliability.

Figure 3:
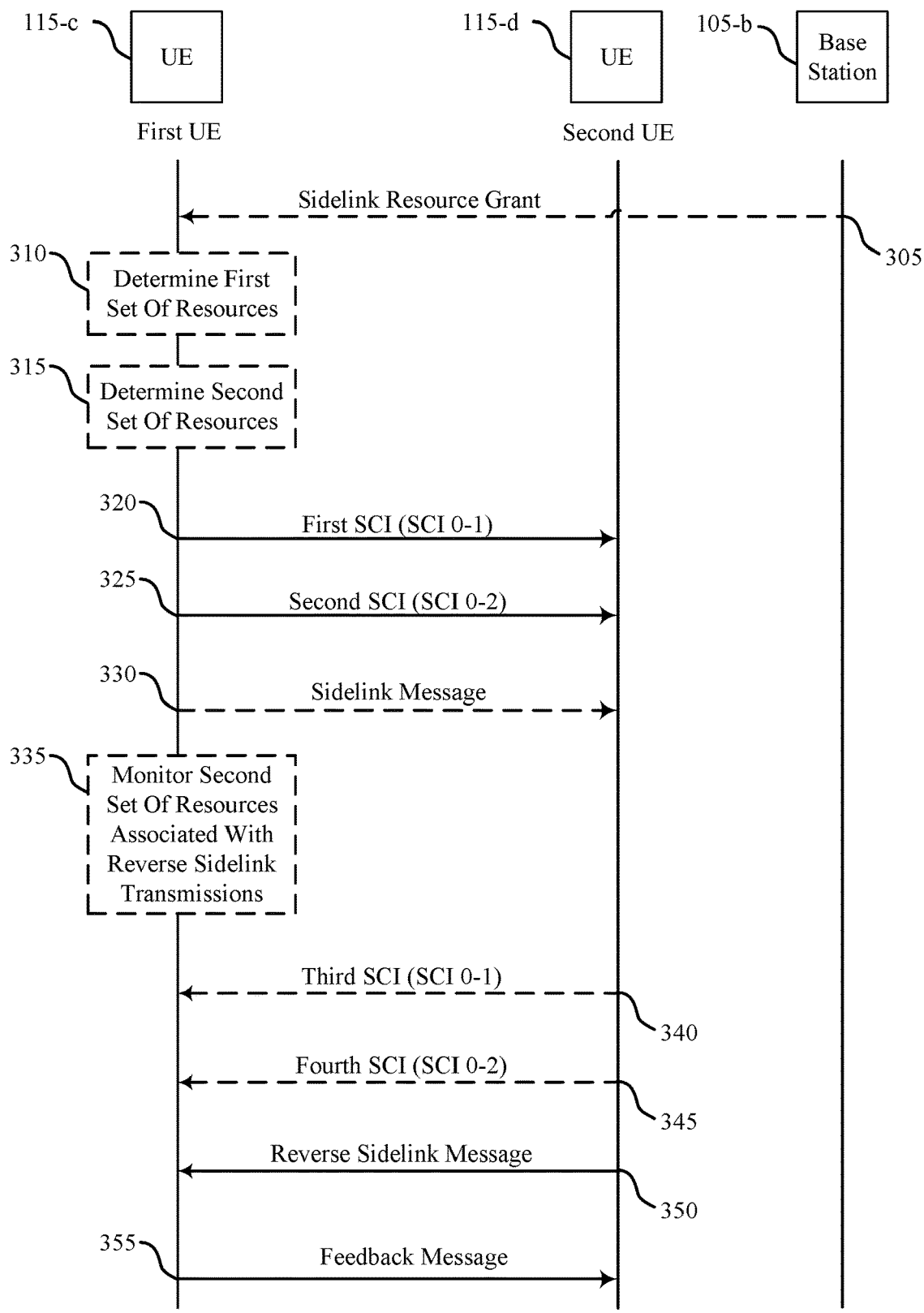
FIG. 3 illustrates an example of a process flow that supports techniques for dynamic scheduling of reverse sidelink traffic in accordance with one or more aspects of the present disclosure.

FIG. 3 illustrates an example of a process flow 300 that supports techniques for dynamic scheduling of reverse sidelink traffic in accordance with one or more aspects of the present disclosure. In some examples, process flow 300 may implement aspects of wireless communications system 100 or 200. For example, the process flow 300 may illustrate transmitting a first SCI and a second SCI, monitoring a set of resources associated with reverse sidelink transmissions, and receiving a reverse sidelink transmission, as described with reference to FIGS. 1-2.

In some cases, process flow 300 may include a first UE 115-*c*, a second UE 115-*d*, and a base station 105-*b* which may be examples of corresponding devices as described herein. The first UE 115-*c* and the second UE 115-*d* illustrated in FIG. 3 may be examples of the first UE 115-*a* and the second UE 115-*b*, respectively, illustrated in FIG. 2. Similarly, the base station 105-*b* illustrated in FIG. 3 may be an example of the base station 105-*a* illustrated in FIG. 2. In some aspects, the first UE 115-*c* and the second UE 115-*d* may communicate over a sidelink communication link, such as the communication link 205-*c* illustrated in FIG. 2.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the base station 105-*b* may transmit a sidelink resource grant to the first UE 115-*c*. The sidelink resource grant may indicate a first set of resources (e.g., time resources, frequency resources) for communications over a sidelink communication link between the first UE 115-*c* and the second UE 115-*d*.

At 310, the first UE 115-*c* may determine the first set of resources for communications over the sidelink communication link between the first UE 115-*c* and the second UE 115-*d*. In some aspects, the first UE 115-*c* may determine the first set of resources based on the sidelink resource grant received from the base station 105-*b* at 305.

At 315, the first UE 115-*c* may determine a second set of resources for reverse sidelink transmissions over the sidelink communication link between from the second UE 115-*d* to the first UE 115-*c*. In some aspects, the first UE 115-*c* may determine the second set of resources based on the sidelink resource grant received from the base station 105-*b* at 305. In some cases, the second set of resources allocated for reverse sidelink transmissions may include a subset of the first set of resources allocated for sidelink transmissions over the sidelink communication link between the first UE 115-*c* and the second UE 115-*d*. In this regard, the first UE 115-*c* may determine the second set of resources based on the first set of resources. In additional or alternative aspects, the second set of resources may not be a subset of the first set of resources, and the first UE 115-*c* may determine the second set of resources independently from the first set of resources.

At 320, the first UE 115-*c* may transmit a first SCI to the second UE 115-*d*. The first UE 115-*c* may transmit the first SCI via the sidelink communication link between the first UE 115-*c* and the second UE 115-*d* based on receiving the sidelink resource grant, determining the first set of resources, determining the second set of resources, or any combination thereof. In some aspects, the first SCI may indicate a set of resources usable by the second UE 115-*b* to receive a second SCI, transmit a reverse sidelink message, or both. In some aspects, the first SCI may include a reverse sidelink scheduling indicator. The reverse sidelink scheduling indicator may be configured to indicate, to the second UE 115-*d*, dynamic scheduling of reverse sidelink traffic from the second UE 115-*d* by the first UE 115-*a*. In some cases, the first SCI may include a first type of SCI. For example, the first SCI may include a first-stage SCI (e.g., SCI 0-1) or a second-stage SCI (e.g., SCI 0-2). In additional or alternative aspects, the first SCI may include an indication of an MCS associated with reverse sidelink messages from the second UE 115-*d*.

In some aspects, the reverse sidelink scheduling indicator may be indicated in a bit field of the first SCI. In this regard, a first value in the bit field of the first SCI may indicate that that the first UE 115-*c* is scheduling reverse sidelink traffic from the second UE 115-*d*, and a second value in the bit field of the first SCI may indicate that that the first UE 115-*c* is not scheduling reverse sidelink traffic from the second UE 115-*d*. In this regard, the reverse sidelink scheduling indicator may effectively be used to dynamically enable or disable reverse sidelink scheduling by the first UE 115-*c*. In some aspects, the first SCI may be transmitted via PSCCH.

At 325, the first UE 115-*c* may transmit a second SCI to the second UE 115-*d*. The first UE 115-*c* may transmit the second SCI via the sidelink communication link between the first UE 115-*c* and the second UE 115-*d* based on receiving the sidelink resource grant at 305, determining the first set of resources at 310, determining the second set of resources at 315, transmitting the first SCI at 320, or any combination thereof.

In some aspects, the second SCI may include a reverse sidelink scheduling indicator. The reverse sidelink scheduling indicator may be configured to indicate, to the second UE 115-*d*, dynamic scheduling of reverse sidelink traffic from the second UE 115-*d* by the first UE 115-*a*. In this regard, the reverse sidelink scheduling indicator may be indicated via the first SCI, the second SCI, or both. In some cases, the second SCI may include a second-stage SCI (e.g., SCI 0-2). In some aspects, the reverse sidelink scheduling indicator may be indicated in a bit field of the second SCI. In this regard, a first value in the bit field of the second SCI may indicate that that the first UE 115-*c* is scheduling reverse sidelink traffic from the second UE 115-*d*, and a second value in the bit field of the second SCI may indicate that that the first UE 115-*c* is not scheduling reverse sidelink traffic from the second UE 115-*d*. In this regard, the reverse sidelink scheduling indicator may effectively be used to dynamically enable or disable reverse sidelink scheduling by the first UE 115-*c*.

In some aspects, the second SCI may indicate the second set of resources (e.g., time resources, frequency resources) for reverse sidelink transmissions from the second UE 115-*d* to the first UE 115-*c*. For example, the second SCI may include a sidelink grant (e.g., dynamic sidelink grant) indicating the second set of resources for reverse sidelink transmissions from the second UE 115-*d* to the first UE 115-*c*. Additionally or alternatively, the first UE 115-*c* may transmit the sidelink grant (e.g., dynamic sidelink grant) via a sidelink message or transmission which is different from the second SCI.

In some cases, the second SCI may include a second type of SCI that is different from the first type of SCI. For example, the second SCI may include a second-stage SCI (e.g., SCI 0-2). In additional or alternative aspects, the second SCI may include an indication of one or more parameters associated with reverse sidelink messages from the second UE 115-*d*. Parameters associated with reverse sidelink messages which may be indicated in the second SCI may include, but are not limited to, an MCS, a redundancy version, a HARQ process identifier, identifiers associated with the first UE 115-*c* and the second UE 115-*d* (e.g., source identifier, destination identifier), and the like. Additionally or alternatively, the second SCI may include an indication of a request for the second UE 115-*d* to transmit a new reverse sidelink message, a request to retransmit a previously-transmitted reverse sidelink message, or both. In some aspects, the second SCI may be transmitted via PSSCH.

At 330, the first UE 115-*c* may transmit a sidelink message to the second UE 115-*d*. The first UE 115-*c* may transmit the sidelink message via the sidelink communication link between the first UE 115-*c* and the second UE 115-*d*. In some aspects, the first UE 115-*c* may transmit the sidelink message at 325 in addition to the first SCI transmitted at 320 and/or the second SCI transmitted at 325. Additionally or alternatively, the second UE 115-*d* may transmit the sidelink message based on (e.g., responsive to) a sidelink grant (e.g., dynamic sidelink grant) indicated in the second SCI and/or alternative sidelink signaling. In some aspects, the sidelink message may be transmitted via PSSCH.

At 335, the first UE 115-*c* may monitor the second set of resources associated with reverse sidelink transmissions from the second UE 115-*d* to the first UE 115-*c*. In some aspects, the first UE 115-*c* may monitor the second set of resources based on determining the second set of resources at 315, transmitting the first SCI at 320, transmitting the second SCI at 325, or any combination thereof.

At 340 the first UE 115-c may receive a third SCI from the second UE 115-d. In some cases, the first UE 115-c may receive the third SCI based on (e.g., in response to) transmitting the first SCI, transmitting the second SCI, monitoring the second set of resources, or any combination thereof. In some aspects, the third SCI may include the first type of SCI. For example, the third SCI may include a first-stage SCI (e.g., SCI 0-1). In some aspects, the third SCI may be transmitted via PSCCH.

At 345 the first UE 115-c may receive a fourth SCI from the second UE 115-d. In some cases, the first UE 115-c may receive the fourth SCI based on (e.g., in response to) transmitting the first SCI, transmitting the second SCI, monitoring the second set of resources, or any combination thereof. In some aspects, the fourth SCI may include the second type of SCI. For example, the fourth SCI may include a second-stage SCI (e.g., SCI 0-2). In some aspects, the fourth SCI may be transmitted via PSSCH.

At 350, the first UE 115-c may receive a reverse sidelink message from the second UE 115-d. The first UE 115-c may receive the reverse sidelink message from the second UE 115-d via the sidelink communication link between the first UE 115-c and the second UE 115-d based on (e.g., in response to) transmitting the first SCI, transmitting the second SCI, monitoring the second set of resources, receiving the third SCI, receiving the fourth SCI, or any combination thereof. For example, in cases where the first SCI and/or the second SCI includes an indication of a reverse sidelink scheduling indicator, the second UE 115-d may transmit the reverse sidelink message at 350 based on the indicated reverse sidelink scheduling indicator. By way of another example, in cases where the first SCI and/or the second SCI includes an indication of an MCS associated with reverse sidelink transmissions, the second UE 115-d may transmit the reverse sidelink message at 350 based on the indicated MCS. By way of another example, in cases where there the second SCI indicates a redundancy version or a request to transmit the reverse sidelink message, the second UE 115-d may transmit the reverse sidelink message at 350 based on the indicated redundancy version, the indicated request, or both. By way of another example, in cases where the second SCI includes an indication of a first identifier associated with the first UE 115-c and a second identifier associated with the second UE 115-d, the second UE 115-d may transmit the reverse sidelink message at 350 based on the first identifier, the second identifier, or both.

In some aspects, the third SCI and/or the fourth SCI may indicate one or more parameters associated with the reverse sidelink message which is transmitted at 350. In some cases, the second UE 115-d may transmit the reverse sidelink message based on the parameters associated with reverse sidelink traffic indicated by the first SCI and/or the second SCI. In this regard, the third SCI and/or the fourth SCI may indicate (e.g., mirror) the same parameters (e.g., time resources, frequency resources, MCS, redundancy version, HARQ process identifier) which were indicated in the first SCI and/or the second SCI. In some cases, the second UE 115-d may refrain from transmitting the third SCI and/or the fourth SCI when all fields/parameters associated with the reverse sidelink message may be inferred by the dynamic scheduling of the reverse sidelink message via the first SCI and/or the second SCI. It is noted herein, however, that other UEs within a wireless communications system monitor a sidelink network for first-stage SCI (e.g., third SCI) in order to determine availability of the sidelink network when the sidelink network is operated in Mode 2. Accordingly, in some cases, the second UE 115-d may refrain from transmitting the fourth SCI when parameters of the reverse sidelink message may be inferred, but may transmit the third SCI in order to allow other UEs to perform sidelink channel sensing and selection.

Alternatively, in some cases, the second UE 115-d may select its own parameters (e.g., time resources, frequency resources, MCS, redundancy version, HARQ process identifier) with which to transmit the reverse sidelink message which are different from those parameters indicated in the first SCI and/or the second SCI. In this regard, the parameters indicated in the first SCI and/or the second SCI may be regarded as "recommended" parameters for the second UE 115-d to use. In cases where the second UE 115-d selects parameters which are different from the recommended parameters indicated in the first SCI and/or the second SCI, the selected parameters may be indicated in the third SCI and/or the fourth SCI.

At 355, the first UE 115-c may transmit a feedback message (e.g., ACK/NACK) to the second UE 115-d. The first UE 115-c may transmit the feedback message based on (e.g., in response to) transmitting the first SCI, transmitting the second SCI, receiving the third SCI, receiving the fourth SCI, receiving the reverse sidelink message, or any combination thereof. In some cases, the first UE 115-c may transmit the feedback message based on a HARQ process identifier indicated in the second SCI transmitted at 325 or the fourth SCI received at 345.

Techniques described herein may enable the first UE 115-c to schedule reverse sidelink transmissions from the second UE 115-d, thereby reducing control signaling overhead within a wireless communications system (e.g., wireless communications system 100 or 200). Additionally, techniques described herein may enable higher-complexity UEs 115 (e.g., the first UE 115-c) to schedule reverse sidelink transmissions from lower-complexity UEs 115 (e.g., the second UE 115-d), thereby reducing potential interference and improving wireless signaling reliability.

Figure 4:
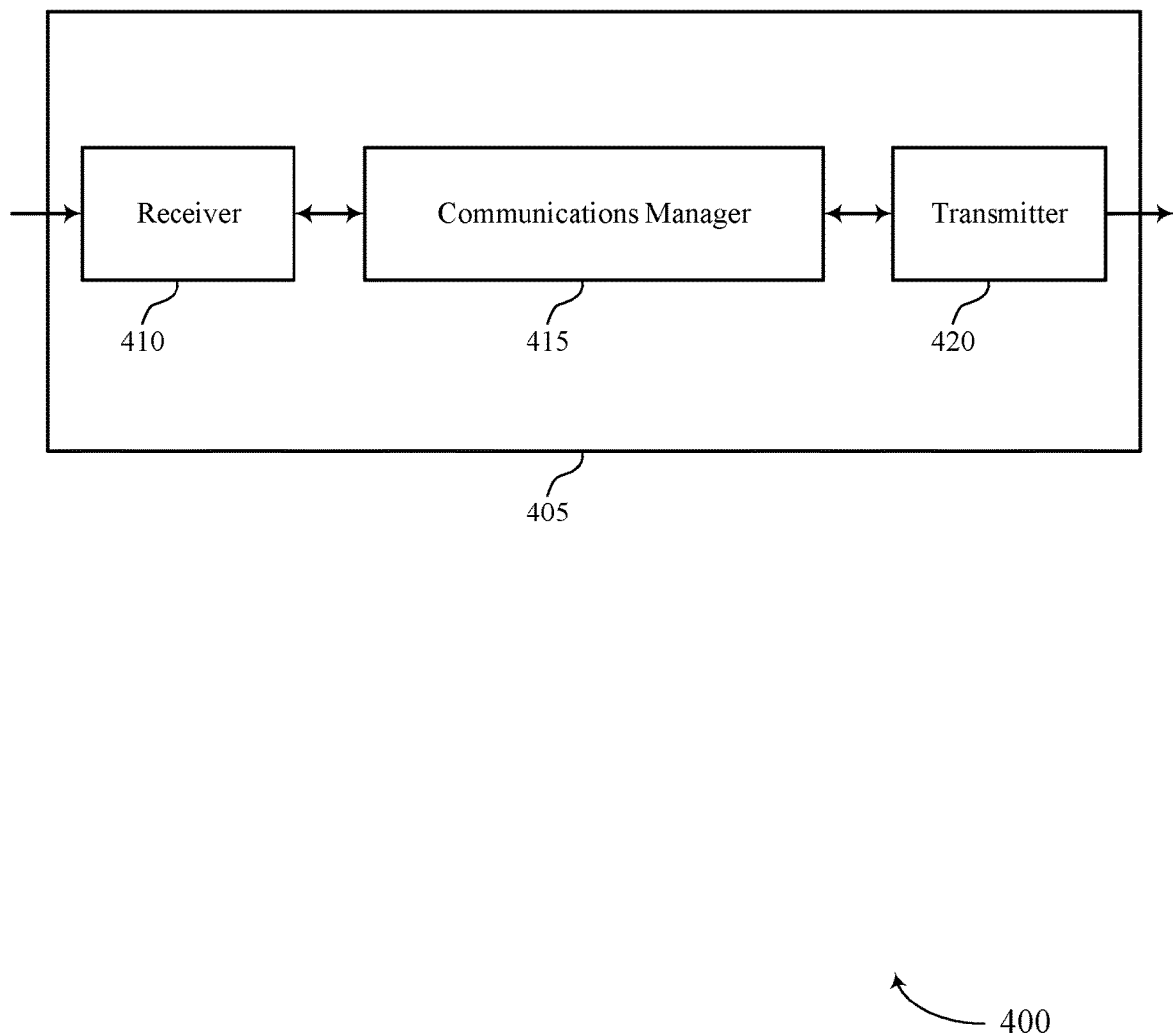
FIGS. 4 and 5 show block diagrams of devices that support techniques for dynamic scheduling of reverse sidelink traffic in accordance with one or more aspects of the present disclosure.

FIG. 4 shows a block diagram 400 of a device 405 that supports techniques for dynamic scheduling of reverse sidelink traffic in accordance with one or more aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques for dynamic scheduling of reverse sidelink traffic, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may determine a first set of resources for communications over a sidelink communication link between the first UE and a second UE, transmit, to the second UE via the sidelink communication link, a first SCI including a reverse sidelink scheduling indicator based on determining the first set of resources, transmit, to the second UE via the sidelink communication link, a second SCI indicating a second set of resources for reverse sidelink transmissions from the second UE to the first UE over the sidelink communication link, where transmitting the second SCI is based on transmitting the first SCI, and receive, from the second UE, a reverse sidelink message in response to transmitting the second SCI. The communications manager 415 may also receive, from a second UE via a sidelink communication link between the first UE and the second UE, a first SCI including a reverse sidelink scheduling indicator, receive, from the second UE via the sidelink communication link, a second SCI indicating a set of resources for reverse sidelink transmissions from the first UE to the second UE over the sidelink communication link, where receiving the second SCI is based on receiving the first SCI, and transmit, to the second UE, a reverse sidelink message in response to receiving the second SCI. The communications manager 415 may be an example of aspects of the communications manager 710 described herein.

The actions performed by the communications manager 415 as described herein may be implemented to realize one or more potential advantages. For example, enabling a first UE 115 (e.g., higher-complexity UE 115) to coordinate and schedule reverse sidelink transmissions from a second UE 115 (e.g., lower-complexity UE 115) to the first UE 115 may provide for more efficient and reliable sidelink communications. Additionally, by enabling for dynamic reverse sidelink scheduling, control signaling overhead within a wireless communications system (e.g., wireless communications system 100 or 200) may be reduced.

By dynamically scheduling reverse sidelink traffic from the second UE 115 to the first UE 115, a processor of the second UE 115 (e.g., a processor controlling the receiver 410, the communications manager 415, the transmitter 420, etc.) may reduce processing resources used for sidelink communications. Moreover, a processor of a higher-complexity UE 115 (e.g., a processor controlling the receiver 410, the communications manager 415, the transmitter 420, etc.) may be more sophisticated and better equipped to handle the processing requirements for scheduling sidelink communications. By transferring some processing resources from lower-complexity UEs 115 to higher-complexity UEs 115, interference and noise within a wireless communications system may be reduced, correspondingly reducing a number of times the processor ramps up processing power and turns on processing units to re-transmit sidelink traffic.

The communications manager 415 may be an example of means for performing various aspects of managing smart repeaters as described herein. The communications manager 415, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 415, or its sub-components, may be implemented in code (e.g., as communications management software or firmware) executed by a processor, or any combination thereof. If implemented in code executed by a processor, the functions of the communications manager 415, or its sub-components may be executed by a general-purpose processor, a DSP, an ASIC, an FPGA, or other programmable logic device.

In some examples, the communications manager 415 may be configured to perform various operations (e.g., receiving, determining, transmitting) using or otherwise in cooperation with the receiver 410, the transmitter 420, or both.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
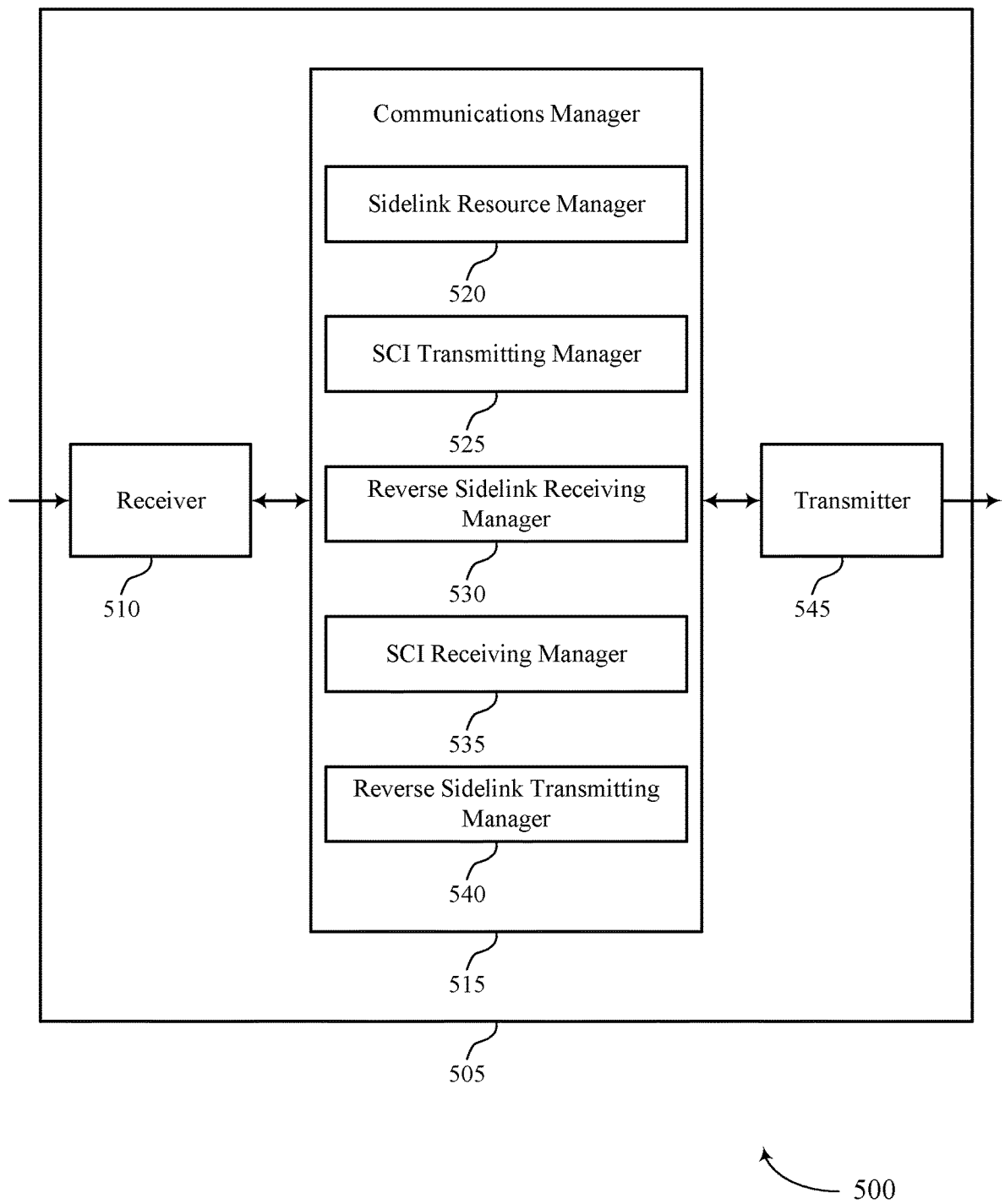

FIG. 5 shows a block diagram 500 of a device 505 that supports techniques for dynamic scheduling of reverse sidelink traffic in accordance with one or more aspects of the present disclosure. The device 505 may be an example of aspects of a device 405, or a UE 115 as described herein. The device 505 may include a receiver 510, a communications manager 515, and a transmitter 545. The device 505 may also include a processor. Each of these components may be in communication with one another (e.g., via one or more buses).

The receiver 510 may receive information such as packets, user data, or control information associated with various information channels (e.g., control channels, data channels, and information related to techniques for dynamic scheduling of reverse sidelink traffic, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a sidelink resource manager 520, an SCI transmitting manager 525, a reverse sidelink receiving manager 530, an SCI receiving manager 535, and a reverse sidelink transmitting manager 540. The communications manager 515 may be an example of aspects of the communications manager 710 described herein.

The sidelink resource manager 520 may determine a first set of resources for communications over a sidelink communication link between the first UE and a second UE.

The SCI transmitting manager 525 may transmit, to the second UE via the sidelink communication link, a first SCI including a reverse sidelink scheduling indicator based on determining the first set of resources and transmit, to the second UE via the sidelink communication link, a second SCI indicating a second set of resources for reverse sidelink transmissions from the second UE to the first UE over the sidelink communication link, where transmitting the second SCI is based on transmitting the first SCI.

The reverse sidelink receiving manager 530 may receive, from the second UE, a reverse sidelink message in response to transmitting the second SCI.

The SCI receiving manager 535 may receive, from a second UE via a sidelink communication link between the first UE and the second UE, a first SCI including a reverse sidelink scheduling indicator and receive, from the second UE via the sidelink communication link, a second SCI indicating a set of resources for reverse sidelink transmissions from the first UE to the second UE over the sidelink communication link, where receiving the second SCI is based on receiving the first SCI.

The reverse sidelink transmitting manager 540 may transmit, to the second UE, a reverse sidelink message in response to receiving the second SCI.

The transmitter 545 may transmit signals generated by other components of the device 505. In some examples, the transmitter 545 may be collocated with a receiver 510 in a transceiver module. For example, the transmitter 545 may be an example of aspects of the transceiver 720 described with reference to FIG. 7. The transmitter 545 may utilize a single antenna or a set of antennas.

Figure 6:
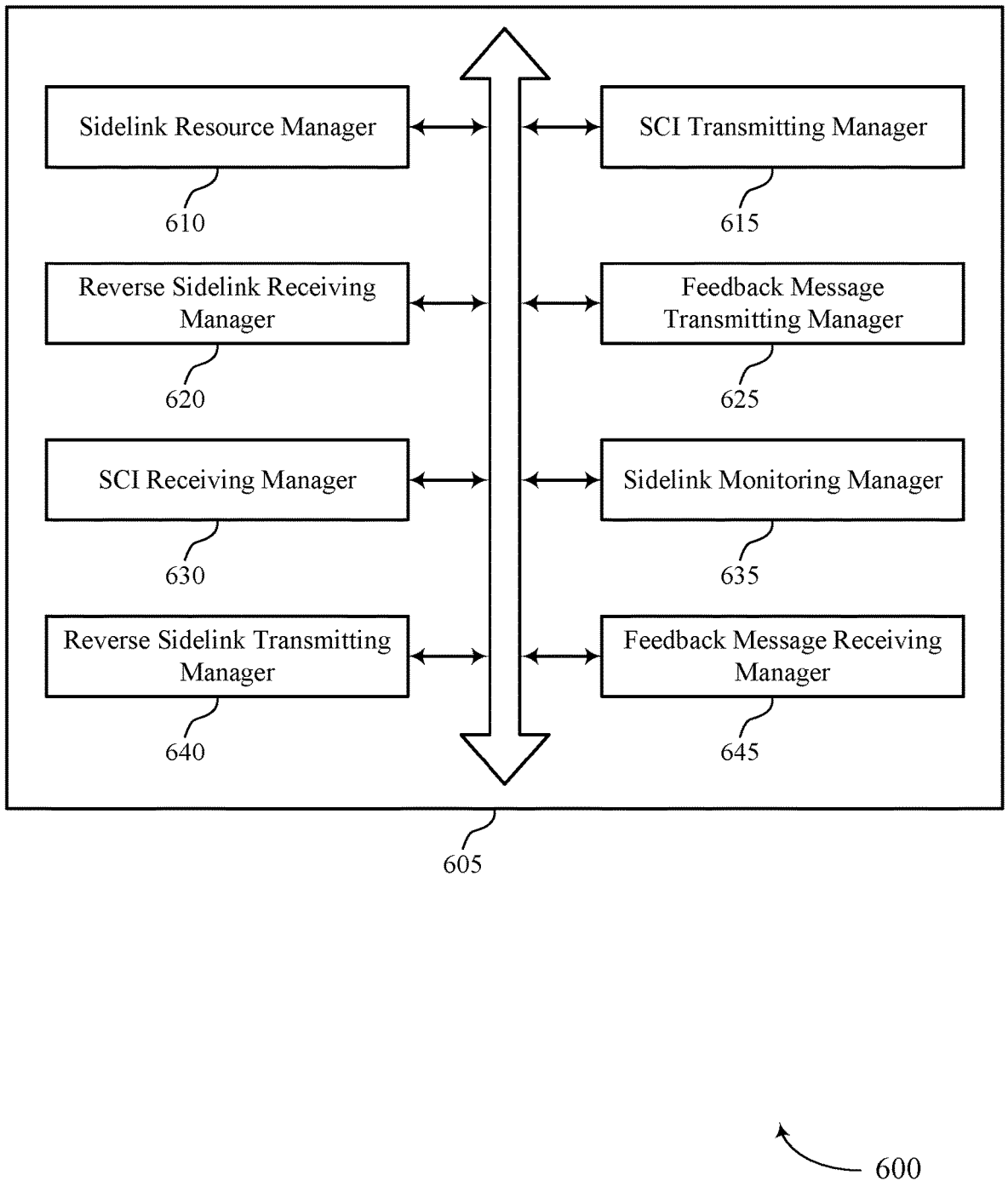
FIG. 6 shows a block diagram of a communications manager that supports techniques for dynamic scheduling of reverse sidelink traffic in accordance with one or more aspects of the present disclosure.

FIG. 6 shows a block diagram 600 of a communications manager 605 that supports techniques for dynamic scheduling of reverse sidelink traffic in accordance with one or more aspects of the present disclosure. The communications manager 605 may be an example of aspects of a communications manager 415, a communications manager 515, or a communications manager 710 described herein. The communications manager 605 may include a sidelink resource manager 610, an SCI transmitting manager 615, a reverse sidelink receiving manager 620, a feedback message transmitting manager 625, an SCI receiving manager 630, a sidelink monitoring manager 635, a reverse sidelink transmitting manager 640, and a feedback message receiving manager 645. Each of these modules may communicate, directly or indirectly, with one another (e.g., via one or more buses).

The sidelink resource manager 610 may determine a first set of resources for communications over a sidelink communication link between the first UE and a second UE. In some cases, the second set of resources include a set of time resources and a set of frequency resources allocated for the reverse sidelink transmissions from the second UE to the first UE over the sidelink communication link. In some cases, the set of resources include a set of time resources and a set of frequency resources allocated for the reverse sidelink transmissions from the first UE to the second UE over the sidelink communication link.

The SCI transmitting manager 615 may transmit, to the second UE via the sidelink communication link, a first SCI including a reverse sidelink scheduling indicator based on determining the first set of resources. In some examples, the SCI transmitting manager 615 may transmit, to the second UE via the sidelink communication link, a second SCI indicating a second set of resources for reverse sidelink transmissions from the second UE to the first UE over the sidelink communication link, where transmitting the second SCI is based on transmitting the first SCI.

In some examples, the SCI transmitting manager 615 may transmit, via at least one of the first SCI or the second SCI, an indication of a MCS associated with the reverse sidelink message, where receiving the reverse sidelink message is based on transmitting the indication of the MCS. In some examples, the SCI transmitting manager 615 may transmit, via the second SCI, an indication of a redundancy version associated with the reverse sidelink message, where receiving the reverse sidelink message is based on transmitting the indication of the redundancy version. In some examples, the SCI transmitting manager 615 may transmit, via the second SCI, an indication of a request for the second UE to transmit a new reverse sidelink message, retransmit a previous reverse sidelink message, or both, where receiving the reverse sidelink message is in response to transmitting the indication of the request. In some examples, the SCI transmitting manager 615 may transmit, via the second SCI, a HARQ process identifier associated with the reverse sidelink transmissions from the second UE to the first UE. In some examples, the SCI transmitting manager 615 may transmit, via the second SCI, an indication of a first identifier associated with the first UE and a second identifier associated with the second UE, where receiving the reverse sidelink message is based on the indication of the first identifier and the indication of the second identifier.

In some examples, the SCI transmitting manager 615 may transmit the first SCI via a PSCCH. In some examples, the SCI transmitting manager 615 may transmit the second SCI via a PSSCH. In some examples, the SCI transmitting manager 615 may transmit, to the second UE, a third SCI, a fourth SCI, or both, where transmitting the reverse sidelink message is based on transmitting the third SCI, the fourth SCI, or both.

In some cases, the first SCI includes a first type of SCI, and where the second SCI includes a second type of SCI different from the first type of SCI. In some cases, the first SCI includes a first-stage SCI, and where the second SCI includes a second-stage SCI. In some cases, the reverse sidelink scheduling indicator is indicated in a bit field of the first SCI.

The reverse sidelink receiving manager 620 may receive, from the second UE, a reverse sidelink message in response to transmitting the second SCI.

The SCI receiving manager 630 may receive, from a second UE via a sidelink communication link between the first UE and the second UE, a first SCI including a reverse sidelink scheduling indicator. In some examples, the SCI receiving manager 630 may receive, from the second UE via the sidelink communication link, a second SCI indicating a set of resources for reverse sidelink transmissions from the first UE to the second UE over the sidelink communication link, where receiving the second SCI is based on receiving the first SCI. In some examples, the SCI receiving manager 630 may receive, from the second UE, a third SCI, a fourth SCI, or both, where receiving the reverse sidelink message is based on receiving the third SCI, the fourth SCI, or both.

In some examples, the SCI receiving manager 630 may receive, via at least one of the first SCI or the second SCI, an indication of a MCS associated with the reverse sidelink message, where transmitting the reverse sidelink message is based on receiving the indication of the MCS. In some examples, the SCI receiving manager 630 may receive, via the second SCI, an indication of a redundancy version associated with the reverse sidelink message, where transmitting the reverse sidelink message is based on receiving the indication of the redundancy version. In some examples, the SCI receiving manager 630 may receive, via the second SCI, an indication of a request for the second UE to transmit a new reverse sidelink message, retransmit a previous reverse sidelink message, or both, where transmitting the reverse sidelink message is in response to receiving the indication of the request. In some examples, the SCI receiving manager 630 may receive, via the second SCI, a HARQ process identifier associated with the reverse sidelink transmissions from the first UE to the second UE. In some examples, the SCI receiving manager 630 may receive, via the second SCI, an indication of a first identifier associated with the first UE and a second identifier associated with the second UE, where transmitting the reverse sidelink message is based on the indication of the first identifier and the indication of the second identifier.

In some examples, the SCI receiving manager 630 may receive the first SCI via a PSCCH. In some examples, the SCI receiving manager 630 may receive the second SCI via a PSSCH. In some cases, the first SCI includes a first type of SCI, and where the second SCI includes a second type of SCI different from the first type of SCI. In some cases, the first SCI includes a first-stage SCI, and where the second SCI includes a second-stage SCI. In some cases, the reverse sidelink scheduling indicator is indicated in a bit field of the first SCI.

The reverse sidelink transmitting manager 640 may transmit, to the second UE, a reverse sidelink message in response to receiving the second SCI.

The feedback message transmitting manager 625 may transmit, to the second UE, a feedback message in response to receiving the reverse sidelink message and the HARQ process identifier. The feedback message receiving manager 645 may receive, from the second UE, a feedback message in response to transmitting the reverse sidelink message and the HARQ process identifier.

The sidelink monitoring manager 635 may monitor the second set of resources associated with the reverse sidelink transmissions from the second UE to the first UE based on transmitting the second SCI, where receiving the reverse sidelink message is based on monitoring the second set of resources.

Figure 7:
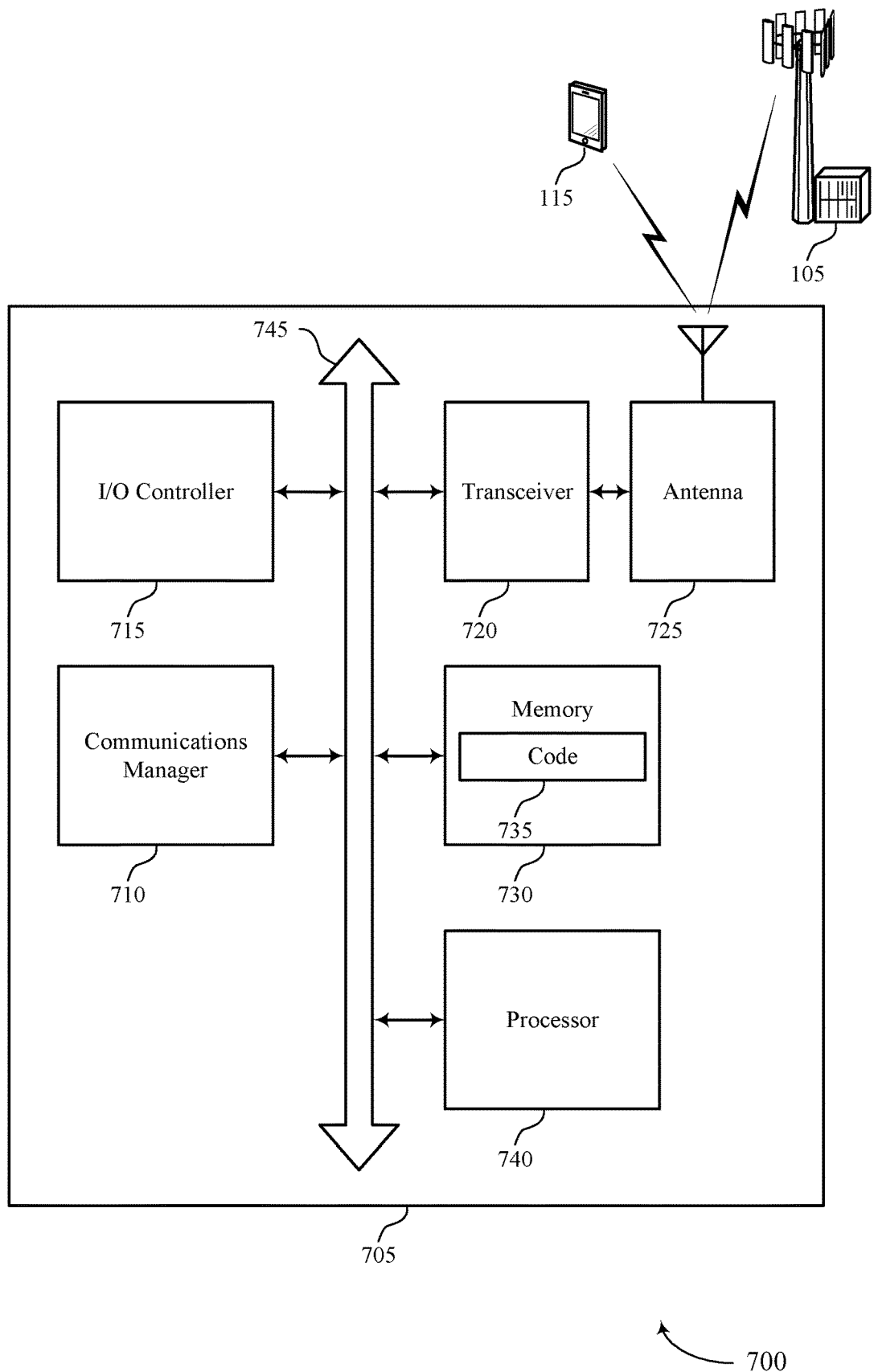
FIG. 7 shows a diagram of a system including a device that supports techniques for dynamic scheduling of reverse sidelink traffic in accordance with one or more aspects of the present disclosure.

FIG. 7 shows a diagram of a system 700 including a device 705 that supports techniques for dynamic scheduling of reverse sidelink traffic in accordance with one or more aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may determine a first set of resources for communications over a sidelink communication link between the first UE and a second UE, transmit, to the second UE via the sidelink communication link, a first SCI including a reverse sidelink scheduling indicator based on determining the first set of resources, transmit, to the second UE via the sidelink communication link, a second SCI indicating a second set of resources for reverse sidelink transmissions from the second UE to the first UE over the sidelink communication link, where transmitting the second SCI is based on transmitting the first SCI, and receive, from the second UE, a reverse sidelink message in response to transmitting the second SCI. The communications manager 710 may also receive, from a second UE via a sidelink communication link between the first UE and the second UE, a first SCI including a reverse sidelink scheduling indicator, receive, from the second UE via the sidelink communication link, a second SCI indicating a set of resources for reverse sidelink transmissions from the first UE to the second UE over the sidelink communication link, where receiving the second SCI is based on receiving the first SCI, and transmit, to the second UE, a reverse sidelink message in response to receiving the second SCI.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for dynamic scheduling of reverse sidelink traffic).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
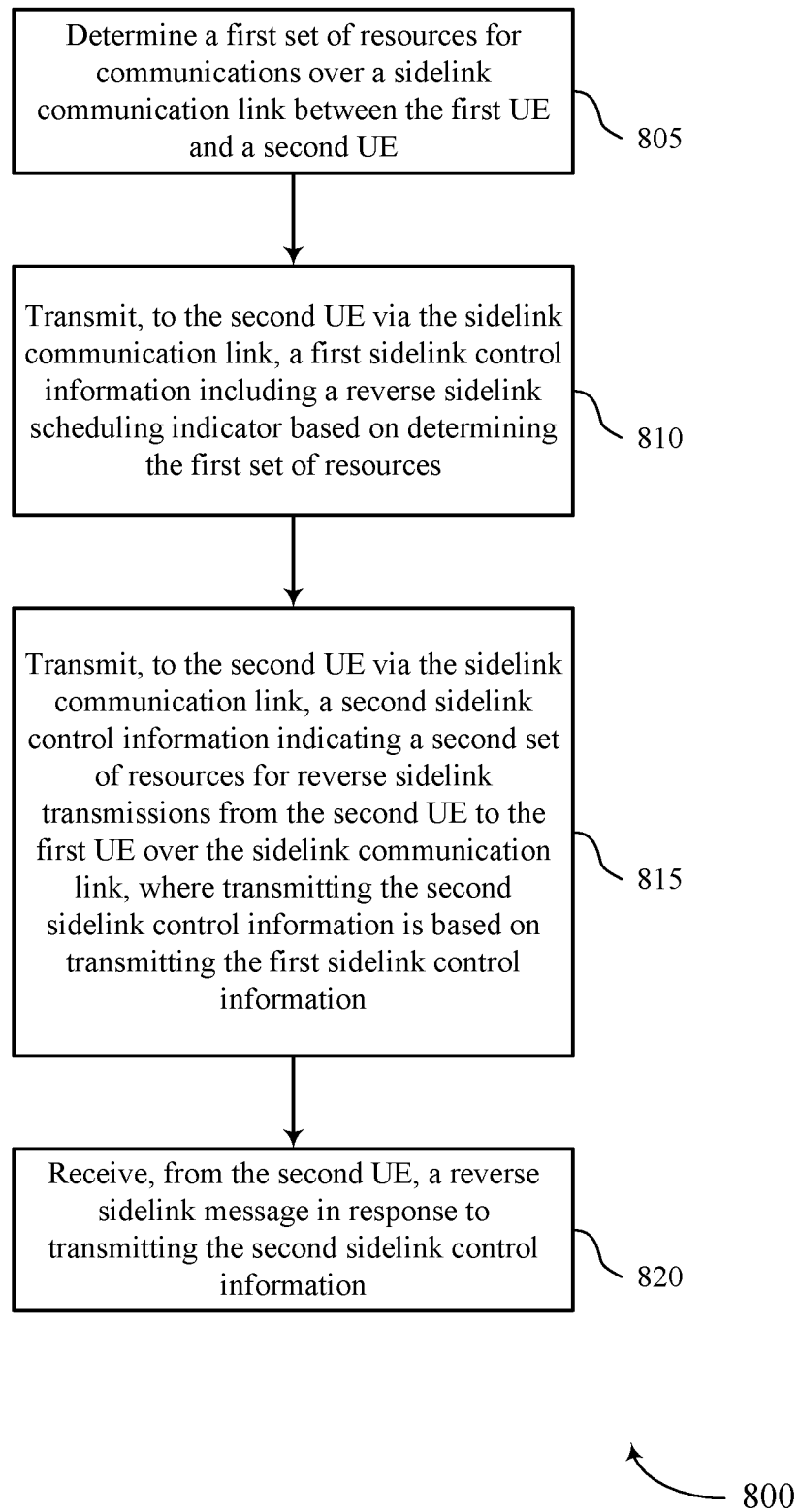
FIGS. 8 through 13 show flowcharts illustrating methods that support techniques for dynamic scheduling of reverse sidelink traffic in accordance with one or more aspects of the present disclosure.

FIG. 8 shows a flowchart illustrating a method 800 that supports techniques for dynamic scheduling of reverse sidelink traffic in accordance with one or more aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described below.

Additionally or alternatively, a UE may perform aspects of the functions described below using special-purpose hardware.

At 805, the UE may determine a first set of resources for communications over a sidelink communication link between the first UE and a second UE. The operations of 805 may be performed according to the methods described herein. In some examples, aspects of the operations of 805 may be performed by a sidelink resource manager as described with reference to FIGS. 4 through 7.

At 810, the UE may transmit, to the second UE via the sidelink communication link, a first SCI including a reverse sidelink scheduling indicator based on determining the first set of resources. The operations of 810 may be performed according to the methods described herein. In some examples, aspects of the operations of 810 may be performed by an SCI transmitting manager as described with reference to FIGS. 4 through 7.

At 815, the UE may transmit, to the second UE via the sidelink communication link, a second SCI indicating a second set of resources for reverse sidelink transmissions from the second UE to the first UE over the sidelink communication link, where transmitting the second SCI is based on transmitting the first SCI. The operations of 815 may be performed according to the methods described herein. In some examples, aspects of the operations of 815 may be performed by an SCI transmitting manager as described with reference to FIGS. 4 through 7.

At 820, the UE may receive, from the second UE, a reverse sidelink message in response to transmitting the second SCI. The operations of 820 may be performed according to the methods described herein. In some examples, aspects of the operations of 820 may be performed by a reverse sidelink receiving manager as described with reference to FIGS. 4 through 7.

Figure 9:
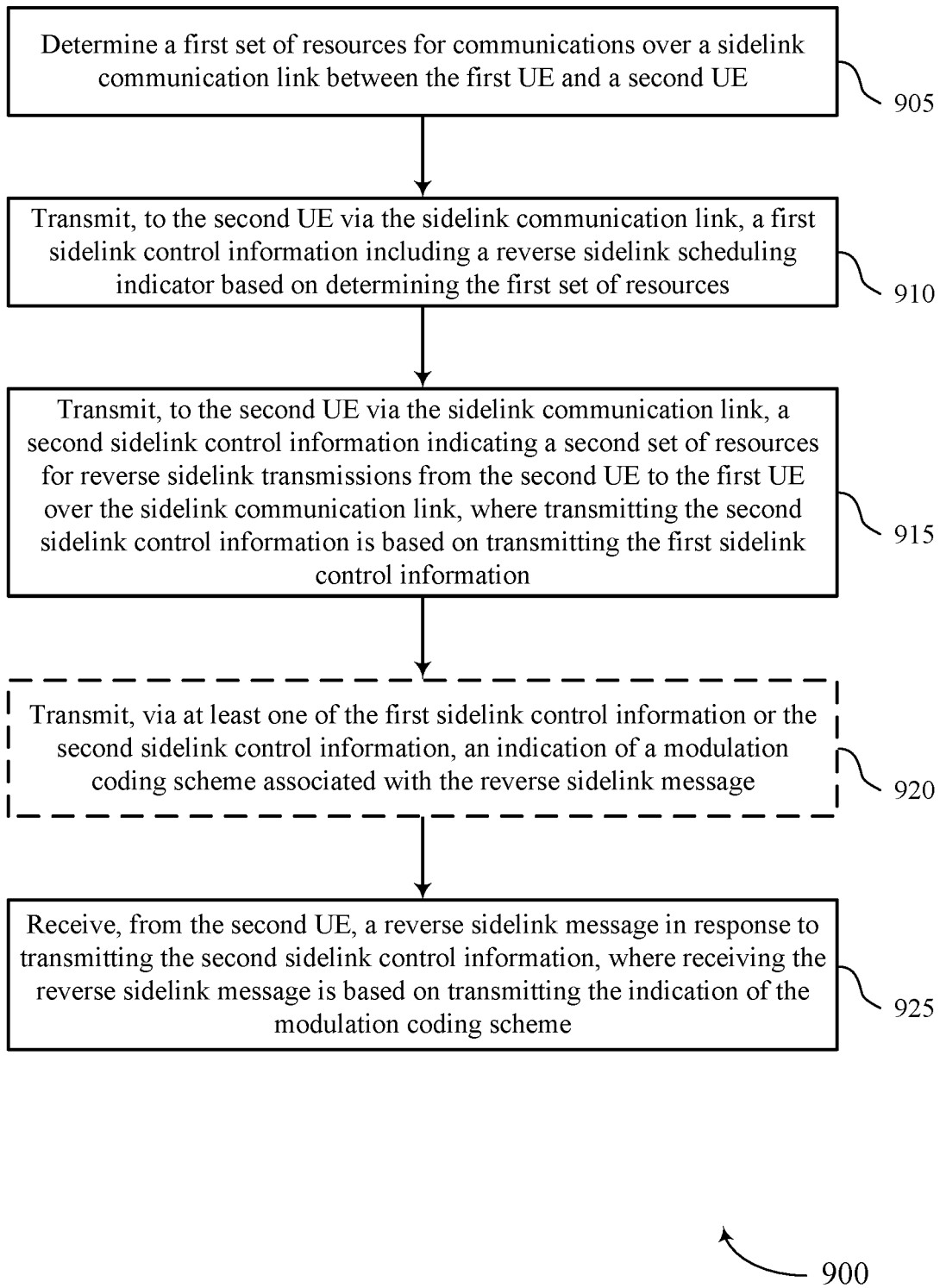

FIG. 9 shows a flowchart illustrating a method 900 that supports techniques for dynamic scheduling of reverse sidelink traffic in accordance with one or more aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE may determine a first set of resources for communications over a sidelink communication link between the first UE and a second UE. The operations of 905 may be performed according to the methods described herein. In some examples, aspects of the operations of 905 may be performed by a sidelink resource manager as described with reference to FIGS. 4 through 7.

At 910, the UE may transmit, to the second UE via the sidelink communication link, a first SCI including a reverse sidelink scheduling indicator based on determining the first set of resources. The operations of 910 may be performed according to the methods described herein. In some examples, aspects of the operations of 910 may be performed by an SCI transmitting manager as described with reference to FIGS. 4 through 7.

At 915, the UE may transmit, to the second UE via the sidelink communication link, a second SCI indicating a second set of resources for reverse sidelink transmissions from the second UE to the first UE over the sidelink communication link, where transmitting the second SCI is based on transmitting the first SCI. The operations of 915 may be performed according to the methods described herein. In some examples, aspects of the operations of 915 may be performed by an SCI transmitting manager as described with reference to FIGS. 4 through 7.

At 920, the UE may transmit, via at least one of the first SCI or the second SCI, an indication of a MCS associated with the reverse sidelink message. The operations of 920 may be performed according to the methods described herein. In some examples, aspects of the operations of 920 may be performed by an SCI transmitting manager as described with reference to FIGS. 4 through 7.

At 925, the UE may receive, from the second UE, a reverse sidelink message in response to transmitting the second SCI, where receiving the reverse sidelink message is based on transmitting the indication of the MCS. The operations of 925 may be performed according to the methods described herein. In some examples, aspects of the operations of 925 may be performed by a reverse sidelink receiving manager as described with reference to FIGS. 4 through 7.

Figure 10:
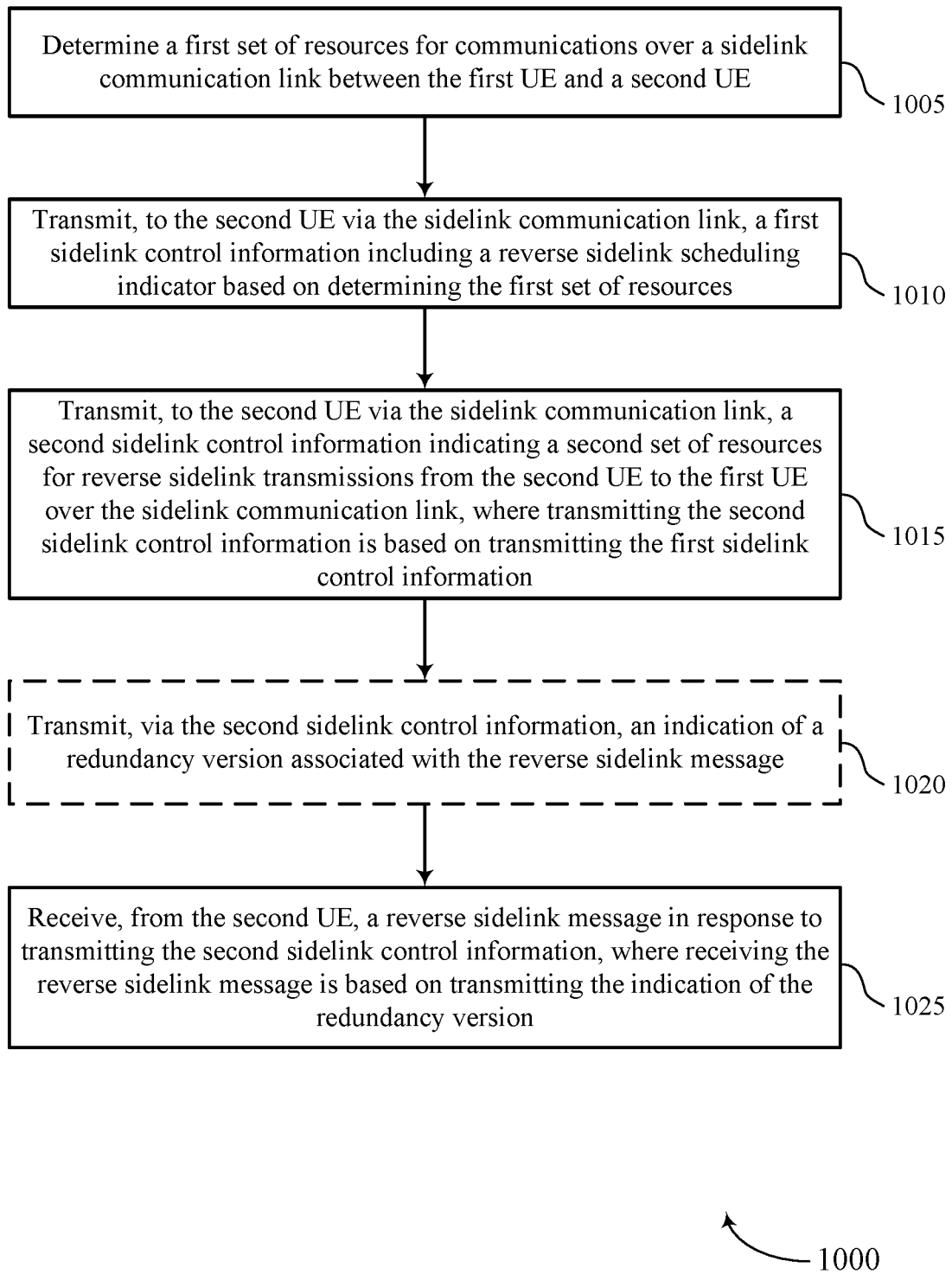

FIG. 10 shows a flowchart illustrating a method 1000 that supports techniques for dynamic scheduling of reverse sidelink traffic in accordance with one or more aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1005, the UE may determine a first set of resources for communications over a sidelink communication link between the first UE and a second UE. The operations of 1005 may be performed according to the methods described herein. In some examples, aspects of the operations of 1005 may be performed by a sidelink resource manager as described with reference to FIGS. 4 through 7.

At 1010, the UE may transmit, to the second UE via the sidelink communication link, a first SCI including a reverse sidelink scheduling indicator based on determining the first set of resources. The operations of 1010 may be performed according to the methods described herein. In some examples, aspects of the operations of 1010 may be performed by an SCI transmitting manager as described with reference to FIGS. 4 through 7.

At 1015, the UE may transmit, to the second UE via the sidelink communication link, a second SCI indicating a second set of resources for reverse sidelink transmissions from the second UE to the first UE over the sidelink communication link, where transmitting the second SCI is based on transmitting the first SCI. The operations of 1015 may be performed according to the methods described herein. In some examples, aspects of the operations of 1015 may be performed by an SCI transmitting manager as described with reference to FIGS. 4 through 7.

At 1020, the UE may transmit, via the second SCI, an indication of a redundancy version associated with the reverse sidelink message. The operations of 1020 may be performed according to the methods described herein. In some examples, aspects of the operations of 1020 may be performed by an SCI transmitting manager as described with reference to FIGS. 4 through 7.

At 1025, the UE may receive, from the second UE, a reverse sidelink message in response to transmitting the second SCI, where receiving the reverse sidelink message is based on transmitting the indication of the redundancy version. The operations of 1025 may be performed according to the methods described herein. In some examples, aspects of the operations of 1025 may be performed by a reverse sidelink receiving manager as described with reference to FIGS. 4 through 7.

Figure 11:
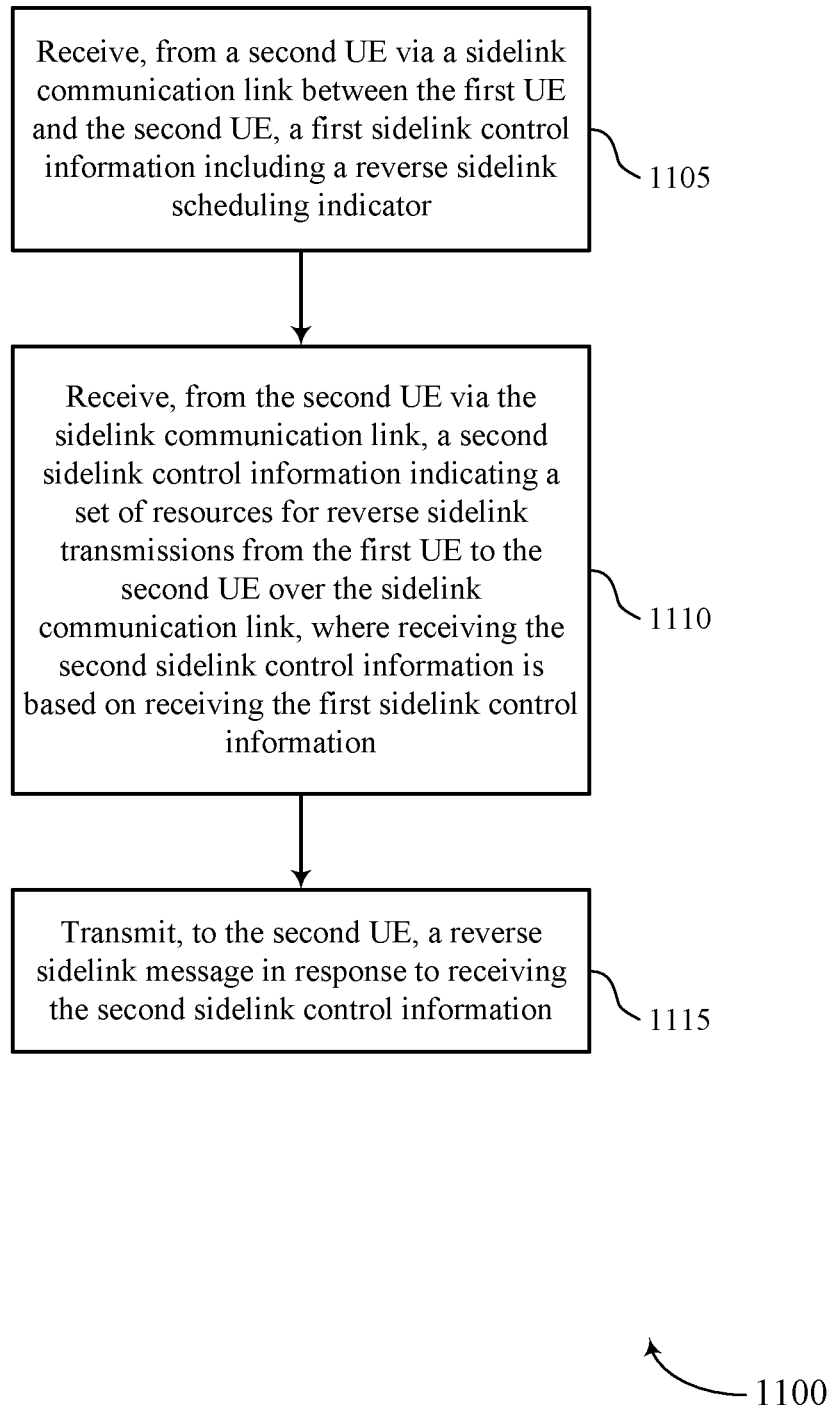

FIG. 11 shows a flowchart illustrating a method 1100 that supports techniques for dynamic scheduling of reverse sidelink traffic in accordance with one or more aspects of the present disclosure. The operations of method 1100 may be implemented by a UE 115 or its components as described herein. For example, the operations of method 1100 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1105, the UE may receive, from a second UE via a sidelink communication link between the first UE and the second UE, a first SCI including a reverse sidelink scheduling indicator. The operations of 1105 may be performed according to the methods described herein. In some examples, aspects of the operations of 1105 may be performed by an SCI receiving manager as described with reference to FIGS. 4 through 7.

At 1110, the UE may receive, from the second UE via the sidelink communication link, a second SCI indicating a set of resources for reverse sidelink transmissions from the first UE to the second UE over the sidelink communication link, where receiving the second SCI is based on receiving the first SCI. The operations of 1110 may be performed according to the methods described herein. In some examples, aspects of the operations of 1110 may be performed by an SCI receiving manager as described with reference to FIGS. 4 through 7.

At 1115, the UE may transmit, to the second UE, a reverse sidelink message in response to receiving the second SCI. The operations of 1115 may be performed according to the methods described herein. In some examples, aspects of the operations of 1115 may be performed by a reverse sidelink transmitting manager as described with reference to FIGS. 4 through 7.

Figure 12:
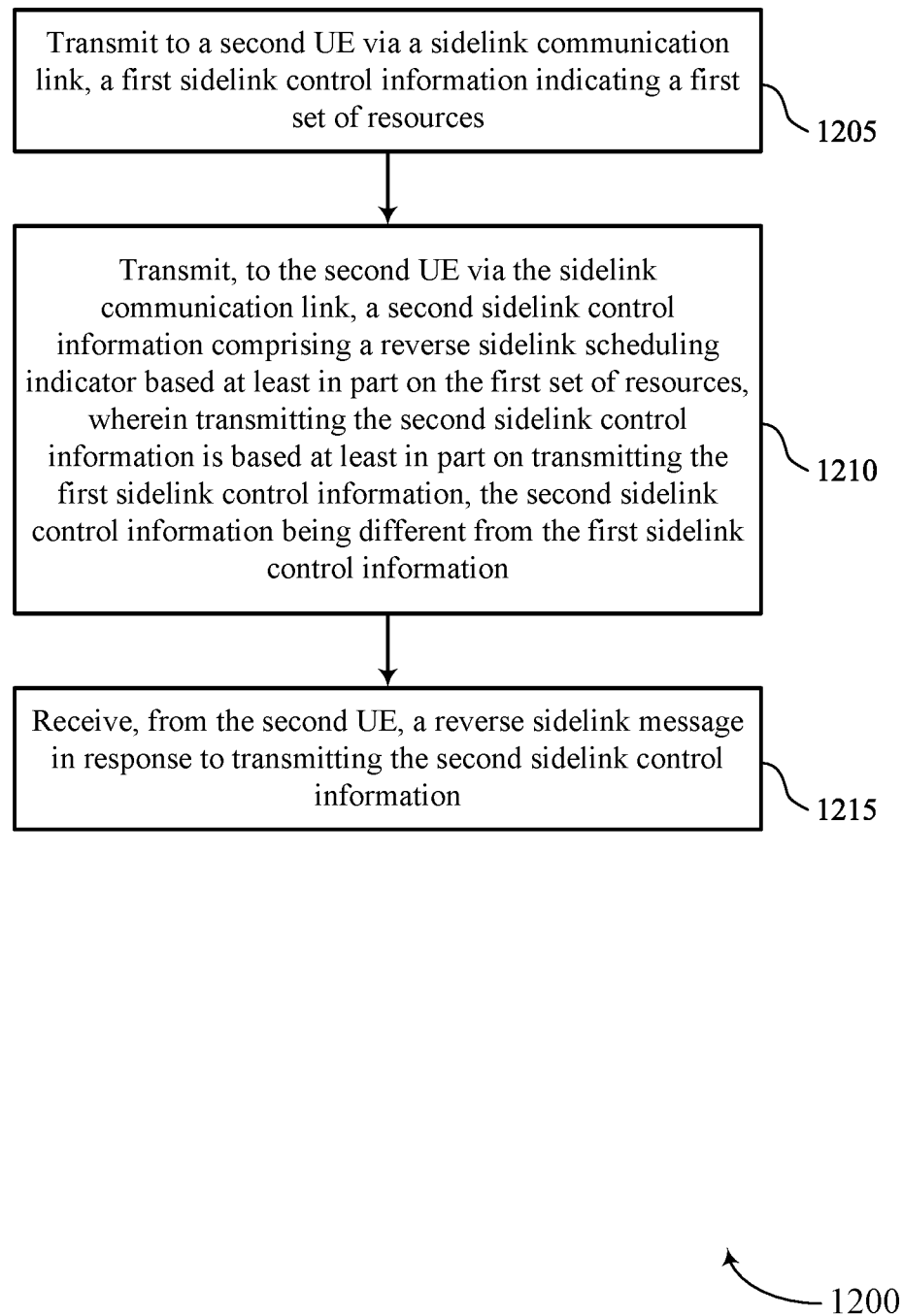

FIG. 12 shows a flowchart illustrating a method 1200 that supports techniques for dynamic scheduling of reverse sidelink traffic in accordance with aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1205, the method may include transmitting to a second UE via a sidelink communication link, a first SCI indicating a first set of resources. The operations of 1205 may be performed in accordance with examples as disclosed herein. In some examples, aspects of the operations of 1205 may be performed by an SCI transmitting manager 525 as described with reference to FIG. 5.

At 1210, the method may include transmitting, to the second UE via the sidelink communication link, a second SCI including a reverse sidelink scheduling indicator based on the first set of resources, where transmitting the second SCI is based on transmitting the first SCI, the second SCI being different from the first SCI. The operations of 1210 may be performed in accordance with examples as disclosed herein. In some examples, aspects of the operations of 1210 may be performed by an SCI transmitting manager 525 as described with reference to FIG. 5.

At 1215, the method may include receiving, from the second UE, a reverse sidelink message in response to transmitting the second SCI. The operations of 1215 may be performed in accordance with examples as disclosed herein. In some examples, aspects of the operations of 1215 may be performed by a reverse sidelink receiving manager 530 as described with reference to FIG. 5.

Figure 13:
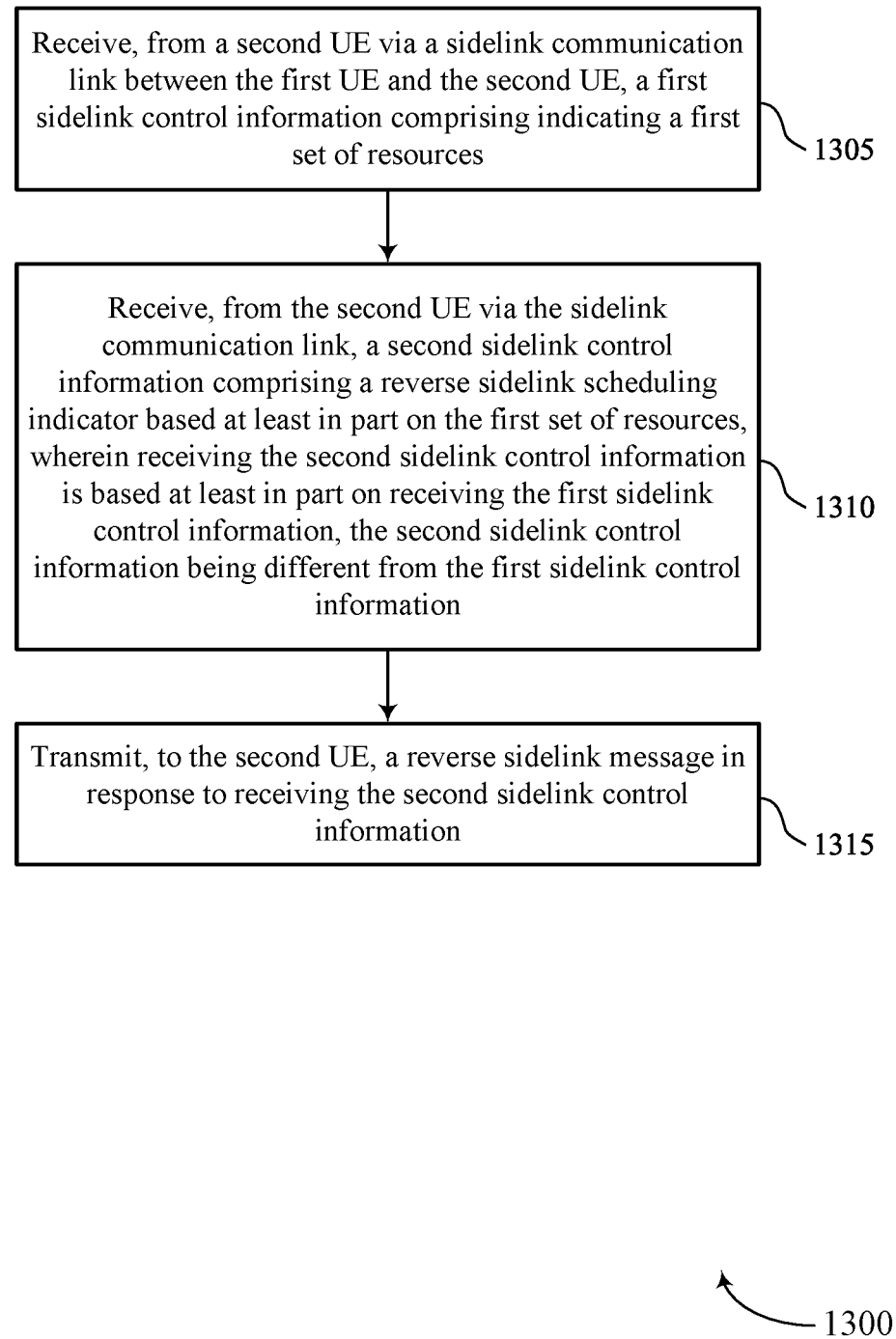

FIG. 13 shows a flowchart illustrating a method 1300 that supports techniques for dynamic scheduling of reverse sidelink traffic in accordance with aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1305, the method may include receiving, from a second UE via a sidelink communication link between the first UE and the second UE, a first SCI including indicating a first set of resources. The operations of 1305 may be performed in accordance with examples as disclosed herein. In some examples, aspects of the operations of 1305 may be performed by an SCI receiving manager 535 as described with reference to FIG. 5.

At 1310, the method may include receiving, from the second UE via the sidelink communication link, a second SCI including a reverse sidelink scheduling indicator based on the first set of resources, where receiving the second SCI is based on receiving the first SCI, the second SCI being different from the first SCI. The operations of 1310 may be performed in accordance with examples as disclosed herein. In some examples, aspects of the operations of 1310 may be performed by a an SCI receiving manager 535 as described with reference to FIG. 5.

At 1315, the method may include transmitting, to the second UE, a reverse sidelink message in response to receiving the second SCI. The operations of 1315 may be performed in accordance with examples as disclosed herein. In some examples, aspects of the operations of 1315 may be performed by a reverse sidelink transmitting manager 540 as described with reference to FIG. 5.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure.

Aspect 1: A method for wireless communication at a first UE, comprising: transmitting to a second UE via a sidelink communication link, a first SCI indicating a first set of resources; transmitting, to the second UE via the sidelink communication link, a second SCI comprising a reverse sidelink scheduling indicator based at least in part on the first set of resources, wherein transmitting the second SCI is based at least in part on transmitting the first SCI, the second SCI being different from the first SCI; and receiving, from the second UE, a reverse sidelink message in response to transmitting the second SCI.

Aspect 2: The method of aspect 1, further comprising: transmitting, via the second SCI, an indication of a request for the second UE to transmit a new reverse sidelink message, retransmit a previous reverse sidelink message, or both, wherein receiving the reverse sidelink message is in response to transmitting the indication of the request.

Aspect 3: The method of any of aspects 1 through 2, further comprising: transmitting, via the second SCI, a HARQ process identifier associated with the reverse sidelink transmissions from the second UE to the first UE.

Aspect 4: The method of aspect 3, further comprising: transmitting, to the second UE, a feedback message in response to receiving the reverse sidelink message and the HARQ process identifier.

Aspect 5: The method of any of aspects 1 through 4, further comprising: transmitting, via the sidelink communication link, a sidelink grant indicating a second set of resources for reverse sidelink transmissions from the second UE to the first UE, wherein receiving the reverse sidelink message is based at least in part on transmitting the sidelink grant.

Aspect 6: The method of any of aspects 1 through 5, further comprising: transmitting, via at least one of the first SCI or the second SCI, an indication of an MCS associated with the reverse sidelink message, wherein receiving the reverse sidelink message is based at least in part on transmitting the indication of the MCS.

Aspect 7: The method of any of aspects 1 through 6, further comprising: transmitting, via the second SCI, an indication of a redundancy version associated with the reverse sidelink message, wherein receiving the reverse sidelink message is based at least in part on transmitting the indication of the redundancy version.

Aspect 8: The method of any of aspects 1 through 7, further comprising: receiving, from the second UE, a third SCI, a fourth SCI, or both, wherein receiving the reverse sidelink message is based at least in part on receiving the third SCI, the fourth SCI, or both.

Aspect 9: The method of any of aspects 1 through 8, wherein the second SCI indicates a second set of resources for reverse sidelink transmissions from the second UE to the first UE over the sidelink communication link, the reverse sidelink message is received within the second set of resources.

Aspect 10: The method of aspect 9, further comprising: monitor the second set of resources associated with the reverse sidelink transmissions from the second UE to the first UE based at least in part on transmitting the second SCI, wherein receiving the reverse sidelink message is based at least in part on monitoring the second set of resources.

Aspect 11: The method of any of aspects 9 through 10, wherein the second set of resources comprise a set of time resources and a set of frequency resources allocated for the reverse sidelink transmissions from the second UE to the first UE over the sidelink communication link.

Aspect 12: The method of any of aspects 1 through 11, further comprising: transmitting, via the second SCI, an indication of a first identifier associated with the first UE and a second identifier associated with the second UE, wherein receiving the reverse sidelink message is based at least in part on the indication of the first identifier and the indication of the second identifier.

Aspect 13: The method of any of aspects 1 through 12, further comprising: transmitting the first SCI via a PSCCH; and transmitting the second SCI via a PSSCH.

Aspect 14: The method of any of aspects 1 through 13, wherein the first SCI comprises a first-stage SCI, and the second SCI comprises a second-stage SCI.

Aspect 15: The method of any of aspects 1 through 14, wherein the reverse sidelink scheduling indicator is indicated in a bit field of the second SCI.

Aspect 16: A method for wireless communication at a first UE, comprising: receiving, from a second UE via a sidelink communication link between the first UE and the second UE, a first SCI comprising indicating a first set of resources; receiving, from the second UE via the sidelink communication link, a second SCI comprising a reverse sidelink scheduling indicator based at least in part on the first set of resources, wherein receiving the second SCI is based at least in part on receiving the first SCI, the second SCI being different from the first SCI; and transmitting, to the second UE, a reverse sidelink message in response to receiving the second SCI.

Aspect 17: The method of aspect 16, further comprising: receiving, via the second SCI, an indication of a request for the second UE to transmit a new reverse sidelink message, retransmit a previous reverse sidelink message, or both, wherein transmitting the reverse sidelink message is in response to receiving the indication of the request.

Aspect 18: The method of any of aspects 16 through 17, further comprising: receiving, via the second SCI, a HARQ process identifier associated with the reverse sidelink transmissions from the first UE to the second UE.

Aspect 19: The method of aspect 18, further comprising: receiving, from the second UE, a feedback message in response to transmitting the reverse sidelink message and the HARQ process identifier.

Aspect 20: The method of any of aspects 16 through 19, further comprising: receiving, from the second UE via the sidelink communication link, a sidelink grant indicating a set of resources for reverse sidelink transmissions from the first UE to the second UE, wherein transmitting the reverse sidelink message is based at least in part on receiving the sidelink grant.

Aspect 21: The method of any of aspects 16 through 20, further comprising: receiving, via at least one of the first SCI or the second SCI, an indication of an MCS associated with the reverse sidelink message, wherein transmitting the reverse sidelink message is based at least in part on receiving the indication of the MCS.

Aspect 22: The method of any of aspects 16 through 21, further comprising: receiving, via the second SCI, an indication of a redundancy version associated with the reverse sidelink message, wherein transmitting the reverse sidelink message is based at least in part on receiving the indication of the redundancy version.

Aspect 23: The method of any of aspects 16 through 22, further comprising: transmitting, to the second UE, a third SCI, a fourth SCI, or both, wherein transmitting the reverse sidelink message is based at least in part on transmitting the third SCI, the fourth SCI, or both.

Aspect 24: The method of any of aspects 16 through 23, wherein the second SCI indicates a set of resources for reverse sidelink transmissions from the second UE to the first UE over the sidelink communication link, the reverse sidelink message is transmitted within the set of resources.

Aspect 25: The method of aspect 24, wherein the set of resources comprise a set of time resources and a set of frequency resources allocated for the reverse sidelink transmissions from the first UE to the second UE over the sidelink communication link.

Aspect 26: The method of any of aspects 16 through 25, further comprising: receiving, via the second SCI, an indication of a first identifier associated with the first UE and a second identifier associated with the second UE, wherein transmitting the reverse sidelink message is based at least in part on the indication of the first identifier and the indication of the second identifier.

Aspect 27: The method of any of aspects 16 through 26, further comprising: receiving the first SCI via a PSCCH; and receiving the second SCI via a PSSCH.

Aspect 28: The method of any of aspects 16 through 27, wherein the first SCI comprises a first-stage SCI, and the second SCI comprises a second-stage SCI, and the reverse sidelink scheduling indicator is indicated in a bit field of the second SCI.

Aspect 29: A method for wireless communication at a first UE, comprising: transmitting, to a second UE via a sidelink communication link, a first SCI comprising a reverse sidelink scheduling indicator; transmitting, to the second UE via the sidelink communication link, a second SCI indicating a set of resources for reverse sidelink transmissions from the second UE to the first UE over the sidelink communication link, wherein transmitting the second SCI is based at least in part on transmitting the first SCI, the second SCI being different from the first SCI; and receiving, from the second UE, a reverse sidelink message in response to transmitting the second SCI.

Aspect 30: A method for wireless communication at a first UE, comprising: receiving, from a second UE via a sidelink communication link between the first UE and the second UE, a first SCI comprising a reverse sidelink scheduling indicator; receiving, from the second UE via the sidelink communication link, a second SCI indicating a set of resources for reverse sidelink transmissions from the first UE to the second UE over the sidelink communication link, wherein receiving the second SCI is based at least in part on receiving the first SCI, the second SCI being different from the first SCI; and transmitting, to the second UE, a reverse sidelink message in response to receiving the second SCI.

Aspect 31: An apparatus for wireless communication at a first UE, comprising a processor, and memory coupled to the processor, the processor and memory configured to perform a method of any of aspects 1 through 15.

Aspect 32: An apparatus for wireless communication at a first UE, comprising at least one means for performing a method of any of aspects 1 through 15.

Aspect 33: A non-transitory computer-readable medium storing code for wireless communication at a first UE, the code comprising instructions executable by a processor to perform a method of any of aspects 1 through 15.

Aspect 34: An apparatus for wireless communication at a first UE, comprising a processor, and memory coupled to the processor, the processor and memory configured to perform a method of any of aspects 16 through 28.

Aspect 35: An apparatus for wireless communication at a first UE, comprising at least one means for performing a method of any of aspects 16 through 28.

Aspect 36: A non-transitory computer-readable medium storing code for wireless communication at a first UE, the code comprising instructions executable by a processor to perform a method of any of aspects 16 through 28.

Aspect 37: An apparatus comprising a processor, and memory coupled to the processor, the processor and memory configured to perform a method of any of aspects 29 through 29.

Aspect 38: An apparatus comprising at least one means for performing a method of any of aspects 29 through 29.

Aspect 39: A non-transitory computer-readable medium storing code the code comprising instructions executable by a processor to perform a method of any of aspects 29 through 29.

Aspect 40: An apparatus comprising a processor, and memory coupled to the processor, the processor and memory configured to perform a method of any of aspects 30 through 30.

Aspect 41: An apparatus comprising at least one means for performing a method of any of aspects 30 through 30.

Aspect 42: A non-transitory computer-readable medium storing code the code comprising instructions executable by a processor to perform a method of any of aspects 30 through 30.

Aspect 43: A method for wireless communication at a first UE, including: determining a first set of resources for communications over a sidelink communication link between the first UE and a second UE; transmitting, to the second UE via the sidelink communication link, a first SCI comprising a reverse sidelink scheduling indicator based at least in part on determining the first set of resources; transmitting, to the second UE via the sidelink communication link, a second SCI indicating a second set of resources for reverse sidelink transmissions from the second UE to the first UE over the sidelink communication link, where transmitting the second SCI is based at least in part on transmitting the first SCI; and receiving, from the second UE, a reverse sidelink message in response to transmitting the second SCI.

Aspect 44: The method of aspect 43, further including: transmitting, via the sidelink communication link, a sidelink grant indicating the second set of resources for reverse sidelink transmissions from the second UE to the first UE, where receiving the reverse sidelink message is based at least in part on transmitting the sidelink grant.

Aspect 45: The method of aspects 43 or 44, further including: transmitting, via at least one of the first SCI or the second SCI, an indication of a modulation coding scheme associated with the reverse sidelink message, where receiving the reverse sidelink message is based at least in part on transmitting the indication of the modulation coding scheme.

Aspect 46: The method of any of aspects 43 through 45, further including: transmitting, via the second SCI, an indication of a redundancy version associated with the reverse sidelink message, where receiving the reverse sidelink message is based at least in part on transmitting the indication of the redundancy version.

Aspect 47: The method of any of aspects 43 through 45, further including: transmitting, via the second SCI, an indication of a request for the second UE to transmit a new reverse sidelink message, retransmit a previous reverse sidelink message, or both, where receiving the reverse sidelink message is in response to transmitting the indication of the request.

Aspect 48: The method of any of aspects 43 through 47, further including: transmitting, via the second SCI, a HARQ process identifier associated with the reverse sidelink transmissions from the second UE to the first UE.

Aspect 49: The method of aspect 48, further including: transmitting, to the second UE, a feedback message in response to receiving the reverse sidelink message and the HARQ process identifier.

Aspect 50: The method of any of aspects 43 through 49, further including: receiving, from the second UE, a third SCI, a fourth SCI, or both, where receiving the reverse sidelink message is based at least in part on receiving the third SCI, the fourth SCI, or both.

Aspect 51: The method of any of aspects 43 through 50, further including: monitoring the second set of resources associated with the reverse sidelink transmissions from the second UE to the first UE based at least in part on transmitting the second SCI, where receiving the reverse sidelink message is based at least in part on monitoring the second set of resources.

Aspect 52: The method of any of aspects 43 through 51, further including: transmitting, via the second SCI, an indication of a first identifier associated with the first UE and a second identifier associated with the second UE, where receiving the reverse sidelink message is based at least in part on the indication of the first identifier and the indication of the second identifier.

Aspect 53: The method of any of aspects 43 through 52, where the second set of resources include a set of time resources and a set of frequency resources allocated for the reverse sidelink transmissions from the second UE to the first UE over the sidelink communication link.

Aspect 54: The method of any of aspects 43 through 53, further including: transmitting the first SCI via a PSCCH; and transmitting the second SCI via a PSSCH.

Aspect 55: The method of any of aspects 43 through 54, where the first SCI includes a first type of SCI, and wherein the second SCI comprises a second type of SCI different from the first type of SCI.

Aspect 56: The method of aspect 55, where the first SCI includes a first-stage SCI, and wherein the second SCI comprises a second-stage SCI.

Aspect 57: The method of any of aspects 43 through 56, further where the reverse sidelink scheduling indicator is indicated in a bit field of the first SCI.

Aspect 58: A method for wireless communication at a first UE, including: receiving, from a second UE via a sidelink communication link between the first UE and the second UE, a first SCI comprising a reverse sidelink scheduling indicator; receiving, from the second UE via the sidelink communication link, a second SCI indicating a set of resources for reverse sidelink transmissions from the first UE to the second UE over the sidelink communication link, where receiving the second SCI is based at least in part on receiving the first SCI; and transmitting, to the second UE, a reverse sidelink message in response to receiving the second SCI.

Aspect 59: The method of aspect 58, further including: receiving, from the second UE via the sidelink communication link, a sidelink grant indicating the set of resources for reverse sidelink transmissions from the first UE to the second UE, where transmitting the reverse sidelink message is based at least in part on receiving the sidelink grant.

Aspect 60: The method of any of aspects 58 through 59, further including: receiving, via at least one of the first SCI or the second SCI, an indication of a modulation coding scheme associated with the reverse sidelink message, where transmitting the reverse sidelink message is based at least in part on receiving the indication of the modulation coding scheme.

Aspect 61: The method of any of aspects 58 through 60, further including: receiving, via the second SCI, an indication of a redundancy version associated with the reverse sidelink message, where transmitting the reverse sidelink message is based at least in part on receiving the indication of the redundancy version.

Aspect 62: The method of any of aspects 58 through 61, further including: receiving, via the second SCI, an indication of a request for the second UE to transmit a new reverse sidelink message, retransmit a previous reverse sidelink message, or both, where transmitting the reverse sidelink message is in response to receiving the indication of the request.

Aspect 63: The method of any of aspects 58 through 62, further including: receiving, via the second SCI, a HARQ process identifier associated with the reverse sidelink transmissions from the first UE to the second UE.

Aspect 64: The method of any of aspects 58 through 63, further including: receiving, from the second UE, a feedback message in response to transmitting the reverse sidelink message and the HARQ process identifier.

Aspect 65: The method of any of aspects 58 through 64, further including: transmitting, to the second UE, a third SCI, a fourth SCI, or both, where transmitting the reverse sidelink message is based at least in part on transmitting the third SCI, the fourth SCI, or both.

Aspect 66: The method of any of aspects 58 through 65, further including: receiving, via the second SCI, an indication of a first identifier associated with the first UE and a second identifier associated with the second UE, where transmitting the reverse sidelink message is based at least in part on the indication of the first identifier and the indication of the second identifier.

Aspect 67: The method of any of aspects 58 through 66, where the set of resources include a set of time resources and a set of frequency resources allocated for the reverse sidelink transmissions from the first UE to the second UE over the sidelink communication link.

Aspect 68: The method of any of aspects 58 through 67, further including: receiving the first SCI via a PSCCH, and receiving the second SCI via a PSSCH.

Aspect 69: The method of any of aspects 58 through 68, where the first SCI includes a first type of SCI, and wherein the second SCI comprises a second type of SCI different from the first type of SCI.

Aspect 70: The method of aspect 69, where the first SCI comprises a first-stage SCI, and wherein the second SCI comprises a second-stage SCI.

Aspect 71: The method of any of aspects 58 through 70, further including: wherein the reverse sidelink scheduling indicator is indicated in a bit field of the first SCI.

Aspect 72: An apparatus for wireless communication at a first UE, including: a processor, memory coupled with the processor, the processor and memory configured to: determine a first set of resources for communications over a sidelink communication link between the first UE and a second UE; transmit, to the second UE via the sidelink communication link, a first SCI comprising a reverse sidelink scheduling indicator based at least in part on determining the first set of resources; transmit, to the second UE via the sidelink communication link, a second SCI indicating a second set of resources for reverse sidelink transmissions from the second UE to the first UE over the sidelink communication link, where transmitting the second SCI is based at least in part on transmitting the first SCI; and receive, from the second UE, a reverse sidelink message in response to transmitting the second SCI.

Aspect 73: The apparatus of aspect 72, where the processor and memory are further configured to: transmit, via at least one of the first SCI or the second SCI, an indication of a modulation coding scheme associated with the reverse sidelink message, where receiving the reverse sidelink message is based at least in part on transmitting the indication of the modulation coding scheme.

Aspect 74: The apparatus of any of aspects 72 through 73, where the processor and memory are further configured to: transmit, via the second SCI, an indication of a redundancy version associated with the reverse sidelink message, wherein receiving the reverse sidelink message is based at least in part on transmitting the indication of the redundancy version.

Aspect 75: The apparatus of any of aspects 72 through 74, where the processor and memory are further configured to: transmit, via the second SCI, an indication of a request for the second UE to transmit a new reverse sidelink message, retransmit a previous reverse sidelink message, or both, where receiving the reverse sidelink message is in response to transmitting the indication of the request.

Aspect 76: The apparatus of any of aspects 72 through 75, where the processor and memory are further configured to: transmit, via the second SCI, a HARQ process identifier associated with the reverse sidelink transmissions from the second UE to the first UE.

Aspect 77: The apparatus of any of aspects 72 through 76, the apparatus further including an antenna array, where the processor and memory are further configured to: transmit, to the second UE, a feedback message in response to receiving the reverse sidelink message and the HARQ process identifier.

Aspect 78: The apparatus of any of aspects 72 through 77, where the processor and memory are further configured to: receive, from the second UE, a third SCI, a fourth SCI, or both, where receiving the reverse sidelink message is based at least in part on receiving the third SCI, the fourth SCI, or both.

Aspect 79: The apparatus of any of aspects 72 through 78, where the processor and memory are further configured to: monitor the second set of resources associated with the reverse sidelink transmissions from the second UE to the first UE based at least in part on transmitting the second SCI, where receiving the reverse sidelink message is based at least in part on monitoring the second set of resources.

Aspect 80: The apparatus of any of aspects 72 through 79, where the processor and memory are further configured to: transmit, via the second SCI, an indication of a first identifier associated with the first UE and a second identifier associated with the second UE, where receiving the reverse sidelink message is based at least in part on the indication of the first identifier and the indication of the second identifier.

Aspect 81: The apparatus of any of aspects 72 through 80, where the second set of resources include a set of time resources and a set of frequency resources allocated for the reverse sidelink transmissions from the second UE to the first UE over the sidelink communication link.

Aspect 82: The apparatus of any of aspects 72 through 81, where the processor and memory are further configured to: transmit the first SCI via a PSCCH; and transmit the second SCI via a PSSCH.

Aspect 83: The apparatus of any of aspects 72 through 82, where the first SCI comprises a first type of SCI, and wherein the second SCI comprises a second type of SCI different from the first type of SCI.

Aspect 84: The apparatus of aspect 83, where the first SCI includes a first-stage SCI, and wherein the second SCI comprises a second-stage SCI.

Aspect 85: The apparatus of any of aspects 72 through 84, where the reverse sidelink scheduling indicator is indicated in a bit field of the first SCI.

Aspect 86: An apparatus for wireless communication at a first UE, including: a processor, memory coupled with the processor, the processor and memory configured to: receive, from a second UE via a sidelink communication link between the first UE and the second UE, a first SCI comprising a reverse sidelink scheduling indicator; receive, from the second UE via the sidelink communication link, a second SCI indicating a set of resources for reverse sidelink transmissions from the first UE to the second UE over the sidelink communication link, where receiving the second SCI is based at least in part on receiving the first SCI; and transmit, to the second UE, a reverse sidelink message in response to receiving the second SCI.

Aspect 87: The apparatus of aspect 86, where the processor and memory are further configured to: receive, via at least one of the first SCI or the second SCI, an indication of a modulation coding scheme associated with the reverse sidelink message, where transmitting the reverse sidelink message is based at least in part on receiving the indication of the modulation coding scheme.

Aspect 88: The apparatus of any of aspects 86 through 87, where the processor and memory are further configured to: receive, via the second SCI, an indication of a redundancy version associated with the reverse sidelink message, where transmitting the reverse sidelink message is based at least in part on receiving the indication of the redundancy version.

Aspect 89: The apparatus of any of aspects 86 through 88, where the processor and memory are further configured to: receive, via the second SCI, an indication of a request for the second UE to transmit a new reverse sidelink message, retransmit a previous reverse sidelink message, or both, where transmitting the reverse sidelink message is in response to receiving the indication of the request.

Aspect 90: The apparatus of any of aspects 86 through 89, the apparatus further including an antenna array, where the processor and memory are further configured to: receive, via the second SCI, a HARQ process identifier associated with the reverse sidelink transmissions from the first UE to the second UE.

Aspect 91: The apparatus of aspect 89, where the processor and memory are further configured to: receive, from the second UE, a feedback message in response to transmitting the reverse sidelink message and the HARQ process identifier.

Aspect 92: The apparatus of any of aspects 86 through 91, where the processor and memory are further configured to: transmit, to the second UE, a third SCI, a fourth SCI, or both, where transmitting the reverse sidelink message is based at least in part on transmitting the third SCI, the fourth SCI, or both.

Aspect 93: The apparatus of any of aspects 86 through 92, where the processor and memory are further configured to: receive, via the second SCI, an indication of a first identifier associated with the first UE and a second identifier associated with the second UE, where transmitting the reverse sidelink message is based at least in part on the indication of the first identifier and the indication of the second identifier.

Aspect 94: The apparatus of any of aspects 86 through 93, where the set of resources include a set of time resources and a set of frequency resources allocated for the reverse sidelink transmissions from the first UE to the second UE over the sidelink communication link.

Aspect 95: The apparatus of any of aspects 86 through 94, where the processor and memory are further configured to: receive the first SCI via a PSCCH; and receive the second SCI via a PSSCH.

Aspect 96: The apparatus of any of aspects 86 through 95, where the first SCI comprises a first type of SCI, and wherein the second SCI comprises a second type of SCI different from the first type of SCI.

Aspect 97: The apparatus of aspect 96, where the first SCI includes a first-stage SCI, and wherein the second SCI comprises a second-stage SCI.

Aspect 98: The apparatus of any of aspects 86 through 97, where the reverse sidelink scheduling indicator is indicated in a bit field of the first SCI.

Aspect 99: An apparatus for wireless communication at a first UE, including: means for determining a first set of resources for communications over a sidelink communication link between the first UE and a second UE; means for transmitting, to the second UE via the sidelink communication link, a first SCI comprising a reverse sidelink scheduling indicator based at least in part on determining the first set of resources; means for transmitting, to the second UE via the sidelink communication link, a second SCI indicating a second set of resources for reverse sidelink transmissions from the second UE to the first UE over the sidelink communication link, where transmitting the second SCI is based at least in part on transmitting the first SCI; and means for receiving, from the second UE, a reverse sidelink message in response to transmitting the second SCI.

Aspect 100: An apparatus for wireless communication at a first UE, including: means for receiving, from a second UE via a sidelink communication link between the first UE and the second UE, a first SCI comprising a reverse sidelink scheduling indicator; means for receiving, from the second UE via the sidelink communication link, a second SCI indicating a set of resources for reverse sidelink transmissions from the first UE to the second UE over the sidelink communication link, where receiving the second SCI is based at least in part on receiving the first SCI; and means for transmitting, to the second UE, a reverse sidelink message in response to receiving the second SCI.

Aspect 101: A non-transitory computer-readable medium storing code for wireless communication at a first UE, the code comprising instructions executable by a processor to: determine a first set of resources for communications over a sidelink communication link between the first UE and a second UE; transmit, to the second UE via the sidelink communication link, a first SCI comprising a reverse sidelink scheduling indicator based at least in part on determining the first set of resources; transmit, to the second UE via the sidelink communication link, a second SCI indicating a second set of resources for reverse sidelink transmissions from the second UE to the first UE over the sidelink communication link, where transmitting the second SCI is based at least in part on transmitting the first SCI; and receive, from the second UE, a reverse sidelink message in response to transmitting the second SCI.

Aspect 102: A non-transitory computer-readable medium storing code for wireless communication at a first UE, the code comprising instructions executable by a processor to: receive, from a second UE via a sidelink communication link between the first UE and the second UE, a first SCI comprising a reverse sidelink scheduling indicator; receive, from the second UE via the sidelink communication link, a second SCI indicating a set of resources for reverse sidelink transmissions from the first UE to the second UE over the sidelink communication link, where receiving the second SCI is based at least in part on receiving the first SCI; and transmit, to the second UE, a reverse sidelink message in response to receiving the second SCI.

Aspect 103: An apparatus for wireless communication including a processor, and memory coupled with the processor, the processor and memory configured to perform a method of any one of aspects 43 through 71.

Aspect 104: An apparatus for wireless communication including at least one means for performing a method of any one of aspects 43 through 71.

Aspect 105: A non-transitory computer-readable medium storing code for wireless communication, the code including instructions executable by a processor to perform a method of any one of aspects 43 through 71.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first user equipment (UE), comprising:
    one or more memories; and
    one or more processors coupled with the one or more memories and configured to cause the first UE to:
        transmit, to a second UE via a physical sidelink control channel of a sidelink communication link, a first sidelink control information that indicates a first set of resources;
        transmit, to the second UE via a physical sidelink shared channel of the sidelink communication link, a second sidelink control information that indicates a reverse sidelink scheduling indicator based at least in part on the first set of resources, wherein transmission of the second sidelink control information is based at least in part on the first sidelink control information, the second sidelink control information different from the first sidelink control information; and
        receive, from the second UE, a reverse sidelink message in response to the second sidelink control information.

2. The apparatus of claim 1, wherein the one or more processors are configured to cause the first UE to:
    transmit, via the second sidelink control information, an indication of a request for the second UE to transmit a new reverse sidelink message, retransmit a previous reverse sidelink message, or both, wherein the reverse sidelink message is received in response to the indication of the request.

3. The apparatus of claim 1, wherein the one or more processors are configured to cause the first UE to:
    transmit, via the second sidelink control information, a hybrid automatic repeat request process identifier associated with reverse sidelink transmissions from the second UE to the first UE.

4. The apparatus of claim 3, wherein the one or more processors are configured to cause the first UE to:
    transmit, to the second UE, a feedback message in response to the reverse sidelink message and the hybrid automatic repeat request process identifier.

5. The apparatus of claim 1, wherein the one or more processors are configured to cause the first UE to:
    transmit, via the sidelink communication link, a sidelink grant that indicates a second set of resources for reverse sidelink transmissions from the second UE to the first UE, wherein the reverse sidelink message is received based at least in part on the sidelink grant.

6. The apparatus of claim 1, wherein the one or more processors are configured to cause the first UE to:
    transmit, via at least one of the first sidelink control information or the second sidelink control information, an indication of a modulation and coding scheme associated with the reverse sidelink message, wherein the reverse sidelink message is received based at least in part on the indication of the modulation and coding scheme.

7. The apparatus of claim 1, wherein the one or more processors are configured to cause the first UE to:
    transmit, via the second sidelink control information, an indication of a redundancy version associated with the reverse sidelink message, wherein the reverse sidelink message is received based at least in part on the indication of the redundancy version.

8. The apparatus of claim 1, wherein the one or more processors are configured to cause the first UE to:
receive, from the second UE, a third sidelink control information, a fourth sidelink control information, or both, wherein the reverse sidelink message is received based at least in part on the third sidelink control information, the fourth sidelink control information, or both.

9. The apparatus of claim 1, wherein the second sidelink control information indicates a second set of resources for reverse sidelink transmissions from the second UE to the first UE over the sidelink communication link, wherein the reverse sidelink message is received within the second set of resources.

10. The apparatus of claim 9, wherein the one or more processors are configured to cause the first UE to:
monitor the second set of resources associated with the reverse sidelink transmissions from the second UE to the first UE based at least in part on the second sidelink control information, wherein the reverse sidelink message is received based at least in part on the monitored second set of resources.

11. The apparatus of claim 9, wherein the second set of resources comprise a set of time resources and a set of frequency resources allocated for the reverse sidelink transmissions from the second UE to the first UE over the sidelink communication link.

12. The apparatus of claim 1, further comprising:
an antenna configured to transmit, via the second sidelink control information, an indication of a first identifier associated with the first UE and a second identifier associated with the second UE, wherein the reverse sidelink message is received based at least in part on the indication of the first identifier and the indication of the second identifier.

13. The apparatus of claim 1, wherein the first sidelink control information comprises a first-stage sidelink control information, and wherein the second sidelink control information comprises a second-stage sidelink control information.

14. The apparatus of claim 1, wherein the reverse sidelink scheduling indicator is indicated in a bit field of the second sidelink control information.

15. An apparatus for wireless communication at a first user equipment (UE), comprising:
one or more memories; and
one or more processors coupled with the one or more memories and configured to cause the first UE to:
receive, from a second UE via a physical sidelink control channel of a sidelink communication link between the first UE and the second UE, a first sidelink control information that indicates a first set of resources;
receive, from the second UE via a physical sidelink shared channel of the sidelink communication link, a second sidelink control information that indicates a reverse sidelink scheduling indicator based at least in part on the first set of resources, wherein reception of the second sidelink control information is based at least in part on the first sidelink control information, the second sidelink control information different from the first sidelink control information; and transmit, to the second UE, a reverse sidelink message in response to the second sidelink control information.

16. The apparatus of claim 15, wherein the one or more processors are configured to cause the first UE to:
receive, via the second sidelink control information, an indication of a request for the second UE to transmit a new reverse sidelink message, retransmit a previous reverse sidelink message, or both, wherein the reverse sidelink message is transmitted in response to the indication of the request.

17. The apparatus of claim 15, wherein the one or more processors are configured to cause the first UE to:
receive, via the second sidelink control information, a hybrid automatic repeat request process identifier associated with reverse sidelink transmissions from the first UE to the second UE.

18. The apparatus of claim 17, wherein the one or more processors are configured to cause the first UE to:
receive, from the second UE, a feedback message in response to the reverse sidelink message and the hybrid automatic repeat request process identifier.

19. The apparatus of claim 15, wherein the one or more processors are configured to cause the first UE to:
receive, from the second UE via the sidelink communication link, a sidelink grant that indicates a set of resources for reverse sidelink transmissions from the first UE to the second UE, wherein the reverse sidelink message is transmitted based at least in part on the sidelink grant.

20. The apparatus of claim 15, wherein the one or more processors are configured to cause the first UE to:
receive, via at least one of the first sidelink control information or the second sidelink control information, an indication of a modulation and coding scheme associated with the reverse sidelink message, wherein the reverse sidelink message is transmitted based at least in part on the indication of the modulation and coding scheme.

21. The apparatus of claim 15, wherein the one or more processors are configured to cause the first UE to:
receive, via the second sidelink control information, an indication of a redundancy version associated with the reverse sidelink message, wherein the reverse sidelink message is transmitted based at least in part on the indication of the redundancy version.

22. The apparatus of claim 15, wherein the one or more processors are configured to cause the first UE to:
transmit, to the second UE, a third sidelink control information, a fourth sidelink control information, or both, wherein the reverse sidelink message is transmitted based at least in part on the third sidelink control information, the fourth sidelink control information, or both.

23. The apparatus of claim 15, wherein the second sidelink control information indicates a set of resources for reverse sidelink transmissions from the second UE to the first UE over the sidelink communication link, wherein the reverse sidelink message is transmitted within the set of resources.

24. The apparatus of claim 23, wherein the set of resources comprise a set of time resources and a set of frequency resources allocated for the reverse sidelink transmissions from the first UE to the second UE over the sidelink communication link.

25. The apparatus of claim 15, further comprising:
an antenna configured to receive, via the second sidelink control information, an indication of a first identifier associated with the first UE and a second identifier associated with the second UE, wherein the reverse sidelink message is transmitted based at least in part on the indication of the first identifier and the indication of the second identifier.

26. The apparatus of claim 15, wherein the first sidelink control information comprises a first-stage sidelink control information, and wherein the second sidelink control information comprises a second-stage sidelink control information, and wherein the reverse sidelink scheduling indicator is indicated in a bit field of the second sidelink control information.

27. An apparatus for wireless communication at a first user equipment (UE), comprising:
one or more memories; and
one or more processors coupled with the one or more memories and configured to cause the first UE to:
transmit, to a second UE via a physical sidelink control channel of a sidelink communication link, a first sidelink control information that indicates a reverse sidelink scheduling indicator;
transmit, to the second UE via a physical sidelink shared channel of the sidelink communication link, a second sidelink control information that indicates a set of resources for reverse sidelink transmissions from the second UE to the first UE over the sidelink communication link, wherein the second sidelink control information is transmitted based at least in part on the first sidelink control information, the second sidelink control information different from the first sidelink control information; and
receive, from the second UE, a reverse sidelink message in response to the second sidelink control information.

28. The apparatus of claim 27, wherein the one or more processors are configured to cause the first UE to:
transmit, via the second sidelink control information, an indication of a request for the second UE to transmit a new reverse sidelink message, retransmit a previous reverse sidelink message, or both, wherein the reverse sidelink message is received in response to the indication of the request.

29. The apparatus of claim 27, wherein the one or more processors are configured to cause the first UE to:
transmit, via the second sidelink control information, a hybrid automatic repeat request process identifier associated with reverse sidelink transmissions from the second UE to the first UE.

30. The apparatus of claim 29, wherein the one or more processors are configured to cause the first UE to:
transmit, to the second UE, a feedback message in response to the reverse sidelink message and the hybrid automatic repeat request process identifier.

31. The apparatus of claim 27, wherein the one or more processors are configured to cause the first UE to:
transmit, via the sidelink communication link, a sidelink grant that indicates a second set of resources for reverse sidelink transmissions from the second UE to the first UE, wherein the reverse sidelink message is received based at least in part on the sidelink grant.

32. The apparatus of claim 27, wherein the one or more processors are configured to cause the first UE to:
transmit, via at least one of the first sidelink control information or the second sidelink control information, an indication of a modulation and coding scheme associated with the reverse sidelink message, wherein the reverse sidelink message is received based at least in part on the indication of the modulation and coding scheme.

33. An apparatus for wireless communication at a first user equipment (UE), comprising:
one or more memories; and
one or more processors coupled with the one or more memories and configured to cause the first UE to:
receive, from a second UE via a physical sidelink control channel of a sidelink communication link between the first UE and the second UE, a first sidelink control information that indicates a reverse sidelink scheduling indicator;
receive, from the second UE via a physical sidelink shared channel of the sidelink communication link, a second sidelink control information that indicates a set of resources for reverse sidelink transmissions from the first UE to the second UE over the sidelink communication link, wherein the second sidelink control information is received based at least in part on the first sidelink control information, the second sidelink control information different from the first sidelink control information; and
transmit, to the second UE, a reverse sidelink message in response to the second sidelink control information.

34. The apparatus of claim 33, wherein the one or more processors are configured to cause the first UE to:
receive, via the second sidelink control information, an indication of a request for the second UE to transmit a new reverse sidelink message, retransmit a previous reverse sidelink message, or both, wherein the reverse sidelink message is transmitted in response to the indication of the request.

35. The apparatus of claim 33, wherein the one or more processors are configured to cause the first UE to:
receive, via the second sidelink control information, a hybrid automatic repeat request process identifier associated with reverse sidelink transmissions from the first UE to the second UE.

36. The apparatus of claim 35, wherein the one or more processors are configured to cause the first UE to:
receive, from the second UE, a feedback message in response to the reverse sidelink message and the hybrid automatic repeat request process identifier.

37. The apparatus of claim 33, wherein the one or more processors are configured to cause the first UE to:
receive, from the second UE via the sidelink communication link, a sidelink grant that indicates a set of resources for reverse sidelink transmissions from the first UE to the second UE, wherein the reverse sidelink message is transmitted based at least in part on the sidelink grant.

38. The apparatus of claim 33, wherein the one or more processors are configured to cause the first UE to:
receive, via at least one of the first sidelink control information or the second sidelink control information, an indication of a modulation and coding scheme associated with the reverse sidelink message, wherein the reverse sidelink message is transmitted based at least in part on the indication of the modulation and coding scheme.

39. A method for wireless communication at a first user equipment (UE), the method comprising:
- transmitting, to a second UE via a physical sidelink control channel of a sidelink communication link, a first sidelink control information that indicates a first set of resources;
- transmitting, to the second UE via a physical sidelink shared channel of the sidelink communication link, a second sidelink control information that includes a reverse sidelink scheduling indicator based at least in part on the first set of resources, wherein the second sidelink control information is transmitted based at least in part on the first sidelink control information, the second sidelink control information different from the first sidelink control information; and
- receiving, from the second UE, a reverse sidelink message in response to the second sidelink control information.

40. The method of claim 39, further comprising:
- transmitting, via the second sidelink control information, an indication of a request for the second UE to transmit a new reverse sidelink message, retransmit a previous reverse sidelink message, or both, wherein the reverse sidelink message is received in response to the indication of the request.

41. The method of claim 39, further comprising:
- transmitting, via the second sidelink control information, a hybrid automatic repeat request process identifier associated with reverse sidelink transmissions from the second UE to the first UE.

42. The method of claim 41, further comprising:
- transmitting, to the second UE, a feedback message in response to the reverse sidelink message and the hybrid automatic repeat request process identifier.

43. The method of claim 39, further comprising:
- transmitting, via the sidelink communication link, a sidelink grant that indicates a second set of resources for reverse sidelink transmissions from the second UE to the first UE, wherein the reverse sidelink message is received based at least in part on the sidelink grant.

44. The method of claim 39, further comprising:
- transmitting, via at least one of the first sidelink control information or the second sidelink control information, an indication of a modulation and coding scheme associated with the reverse sidelink message, wherein the reverse sidelink message is received based at least in part on the indication of the modulation and coding scheme.

45. The method of claim 39, further comprising:
- transmitting, via the second sidelink control information, an indication of a redundancy version associated with the reverse sidelink message, wherein the reverse sidelink message is received based at least in part on the indication of the redundancy version.

46. The method of claim 39, further comprising:
- receiving, from the second UE, a third sidelink control information, a fourth sidelink control information, or both, wherein the reverse sidelink message is received based at least in part on the third sidelink control information, the fourth sidelink control information, or both.

47. The method of claim 39, wherein the second sidelink control information indicates a second set of resources for reverse sidelink transmissions from the second UE to the first UE over the sidelink communication link, wherein the reverse sidelink message is received within the second set of resources.

48. The method of claim 47, further comprising:
- monitoring the second set of resources associated with the reverse sidelink transmissions from the second UE to the first UE based at least in part on the second sidelink control information, wherein the reverse sidelink message is received based at least in part on the monitoring.

49. A method for wireless communication at a first user equipment (UE), the method comprising:
- receiving, from a second UE via a physical sidelink control channel of a sidelink communication link between the first UE and the second UE, a first sidelink control information that indicates a first set of resources;
- receiving, from the second UE via a physical sidelink shared channel of the sidelink communication link, a second sidelink control information that indicates a reverse sidelink scheduling indicator based at least in part on the first set of resources, wherein the second sidelink control information is received based at least in part on the first sidelink control information, the second sidelink control information different from the first sidelink control information; and
- transmitting, to the second UE, a reverse sidelink message in response to the second sidelink control information.

50. The method of claim 49, further comprising:
- receiving, via the second sidelink control information, an indication of a request for the second UE to transmit a new reverse sidelink message, retransmit a previous reverse sidelink message, or both, wherein the reverse sidelink message is transmitted in response to the indication of the request.

51. The method of claim 49, further comprising:
- receiving, via the second sidelink control information, a hybrid automatic repeat request process identifier associated with reverse sidelink transmissions from the first UE to the second UE.

52. The method of claim 51, further comprising:
- receiving, from the second UE, a feedback message in response to the reverse sidelink message and the hybrid automatic repeat request process identifier.

53. The method of claim 49, further comprising:
- receiving, from the second UE via the sidelink communication link, a sidelink grant that indicates a set of resources for reverse sidelink transmissions from the first UE to the second UE, wherein the reverse sidelink message is transmitted based at least in part on the sidelink grant.

54. The method of claim 49, further comprising:
- receiving, via at least one of the first sidelink control information or the second sidelink control information, an indication of a modulation and coding scheme associated with the reverse sidelink message, wherein the reverse sidelink message is transmitted based at least in part on the indication of the modulation and coding scheme.

55. The method of claim 49, further comprising:
- receiving, via the second sidelink control information, an indication of a redundancy version associated with the reverse sidelink message, wherein the reverse sidelink message is transmitted based at least in part on the indication of the redundancy version.

56. The method of claim 49, further comprising:
- transmitting, to the second UE, a third sidelink control information, a fourth sidelink control information, or both, wherein the reverse sidelink message is transmitted based at least in part on the third sidelink control information, the fourth sidelink control information, or both.

57. A method for wireless communication at a first user equipment (UE), the method comprising:
transmitting, to a second UE via a physical sidelink control channel of a sidelink communication link, a first sidelink control information that includes a reverse sidelink scheduling indicator;
transmitting, to the second UE via a physical sidelink shared channel of the sidelink communication link, a second sidelink control information that indicates a set of resources for reverse sidelink transmissions from the second UE to the first UE over the sidelink communication link, wherein the second sidelink control information is transmitted based at least in part on the first sidelink control information, the second sidelink control information different from the first sidelink control information; and
receiving, from the second UE, a reverse sidelink message in response to the second sidelink control information.

58. A method for wireless communication at a first user equipment (UE), the method comprising:
receiving, from a second UE via a physical sidelink control channel of a sidelink communication link between the first UE and the second UE, a first sidelink control information that includes a reverse sidelink scheduling indicator;
receiving, from the second UE via a physical sidelink shared channel of the sidelink communication link, a second sidelink control information that indicates a set of resources for reverse sidelink transmissions from the first UE to the second UE over the sidelink communication link, wherein the second sidelink control information is received based at least in part on the first sidelink control information, the second sidelink control information different from the first sidelink control information; and
transmitting, to the second UE, a reverse sidelink message in response to the second sidelink control information.

59. A non-transitory computer-readable medium storing code for wireless communication at a first user equipment (UE), the code comprising instructions executable by one or more processors to cause the first UE to:
transmit, to a second UE via a physical sidelink control channel of a sidelink communication link, a first sidelink control information that indicates a first set of resources;
transmit, to the second UE via a physical sidelink shared channel of the sidelink communication link, a second sidelink control information that includes a reverse sidelink scheduling indicator based at least in part on the first set of resources, wherein the second sidelink control information is transmitted based at least in part on the first sidelink control information, the second sidelink control information different from the first sidelink control information; and
receive, from the second UE, a reverse sidelink message in response to the second sidelink control information.

60. The non-transitory computer-readable medium of claim 59, wherein the instructions are further executable by the one or more processors to cause the first UE to:
transmit, via the second sidelink control information, an indication of a request for the second UE to transmit a new reverse sidelink message, retransmit a previous reverse sidelink message, or both, wherein the reverse sidelink message is received in response to the indication of the request.

61. The non-transitory computer-readable medium of claim 59, wherein the instructions are further executable by the one or more processors to cause the first UE to:
transmit, via the second sidelink control information, a hybrid automatic repeat request process identifier associated with reverse sidelink transmissions from the second UE to the first UE.

62. The non-transitory computer-readable medium of claim 61, wherein the instructions are further executable by the one or more processors to cause the first UE to:
transmit, to the second UE, a feedback message in response to the reverse sidelink message and the hybrid automatic repeat request process identifier.

63. The non-transitory computer-readable medium of claim 59, wherein the instructions are further executable by the one or more processors to cause the first UE to:
transmit, via the sidelink communication link, a sidelink grant that indicates a second set of resources for reverse sidelink transmissions from the second UE to the first UE, wherein the reverse sidelink message is received based at least in part on the sidelink grant.

64. The non-transitory computer-readable medium of claim 59, wherein the instructions are further executable by the one or more processors to cause the first UE to:
transmit, via at least one of the first sidelink control information or the second sidelink control information, an indication of a modulation and coding scheme associated with the reverse sidelink message, wherein the reverse sidelink message is received based at least in part on the indication of the modulation and coding scheme.

65. The non-transitory computer-readable medium of claim 59, wherein the instructions are further executable by the one or more processors to cause the first UE to:
transmit, via the second sidelink control information, an indication of a redundancy version associated with the reverse sidelink message, wherein the reverse sidelink message is received based at least in part on the indication of the redundancy version.

66. The non-transitory computer-readable medium of claim 59, wherein the instructions are further executable by the one or more processors to cause the first UE to:
receive, from the second UE, a third sidelink control information, a fourth sidelink control information, or both, wherein the reverse sidelink message is received based at least in part on the third sidelink control information, the fourth sidelink control information, or both.

67. The non-transitory computer-readable medium of claim 59, wherein the second sidelink control information indicates a second set of resources for reverse sidelink transmissions from the second UE to the first UE over the sidelink communication link, wherein the reverse sidelink message is received within the second set of resources.

68. The non-transitory computer-readable medium of claim 67, wherein the instructions are further executable by the one or more processors to cause the first UE to:
monitor the second set of resources associated with the reverse sidelink transmissions from the second UE to the first UE based at least in part on the second sidelink control information, wherein the reverse sidelink message is received based at least in part on the monitoring.

69. A non-transitory computer-readable medium storing code for wireless communication at a first user equipment (UE), the code comprising instructions executable by one or more processors to cause the first UE to:
- receive, from a second UE via a physical sidelink control channel of a sidelink communication link between the first UE and the second UE, a first sidelink control information that indicates a first set of resources;
- receive, from the second UE via a physical sidelink shared channel of the sidelink communication link, a second sidelink control information that indicates a reverse sidelink scheduling indicator based at least in part on the first set of resources, wherein the second sidelink control information is received based at least in part on the first sidelink control information, the second sidelink control information different from the first sidelink control information; and
- transmit, to the second UE, a reverse sidelink message in response to the second sidelink control information.

70. The non-transitory computer-readable medium of claim 69, wherein the instructions are further executable by the one or more processors to cause the first UE to:
- receive, via the second sidelink control information, an indication of a request for the second UE to transmit a new reverse sidelink message, retransmit a previous reverse sidelink message, or both, wherein the reverse sidelink message is transmitted in response to the indication of the request.

71. The non-transitory computer-readable medium of claim 69, wherein the instructions are further executable by the one or more processors to cause the first UE to:
- receive, via the second sidelink control information, a hybrid automatic repeat request process identifier associated with reverse sidelink transmissions from the first UE to the second UE.

72. The non-transitory computer-readable medium of claim 71, wherein the instructions are further executable by the one or more processors to cause the first UE to:
- receive, from the second UE, a feedback message in response to the reverse sidelink message and the hybrid automatic repeat request process identifier.

73. The non-transitory computer-readable medium of claim 69, wherein the instructions are further executable by the one or more processors to cause the first UE to:
- receive, from the second UE via the sidelink communication link, a sidelink grant that indicates a set of resources for reverse sidelink transmissions from the first UE to the second UE, wherein the reverse sidelink message is transmitted based at least in part on the sidelink grant.

74. The non-transitory computer-readable medium of claim 69, wherein the instructions are further executable by the one or more processors to cause the first UE to:
- receive, via at least one of the first sidelink control information or the second sidelink control information, an indication of a modulation and coding scheme associated with the reverse sidelink message, wherein the reverse sidelink message is transmitted based at least in part on the indication of the modulation and coding scheme.

75. The non-transitory computer-readable medium of claim 69, wherein the instructions are further executable by the one or more processors to cause the first UE to:
- receive, via the second sidelink control information, an indication of a redundancy version associated with the reverse sidelink message, wherein the reverse sidelink message is transmitted based at least in part on the indication of the redundancy version.

76. The non-transitory computer-readable medium of claim 69, wherein the instructions are further executable by the one or more processors to cause the first UE to:
- transmit, to the second UE, a third sidelink control information, a fourth sidelink control information, or both, wherein the reverse sidelink message is transmitted based at least in part on the third sidelink control information, the fourth sidelink control information, or both.

77. A non-transitory computer-readable medium storing code for wireless communication at a first user equipment (UE), the code comprising instructions executable by the one or more processors to cause the first UE to:
- transmit, to a second UE via a physical sidelink control channel of a sidelink communication link, a first sidelink control information that includes a reverse sidelink scheduling indicator;
- transmit, to the second UE via a physical sidelink shared channel of the sidelink communication link, a second sidelink control information that indicates a set of resources for reverse sidelink transmissions from the second UE to the first UE over the sidelink communication link, wherein the second sidelink control information is transmitted based at least in part on the first sidelink control information, the second sidelink control information different from the first sidelink control information; and
- receive, from the second UE, a reverse sidelink message in response to the second sidelink control information.

78. A non-transitory computer-readable medium storing code for wireless communication at a first user equipment (UE), the code comprising instructions executable by one or more processors to cause the first UE to:
- receive, from a second UE via a physical sidelink control channel of a sidelink communication link between the first UE and the second UE, a first sidelink control information that includes a reverse sidelink scheduling indicator;
- receive, from the second UE via a physical sidelink shared channel of the sidelink communication link, a second sidelink control information that indicates a set of resources for reverse sidelink transmissions from the first UE to the second UE over the sidelink communication link, wherein the second sidelink control information is received based at least in part on the first sidelink control information, the second sidelink control information different from the first sidelink control information; and
- transmit, to the second UE, a reverse sidelink message in response to the second sidelink control information.

* * * * *